US005822233A

United States Patent [19]

Kawasaki

[11] Patent Number: 5,822,233

[45] Date of Patent: Oct. 13, 1998

[54] DIGITAL ARITHMETIC CALCULATOR AND DIGITAL COMPUTER USING NON-REDUNDANT (2N+1) NOTATION SYSTEM WITH A RADIX OF (2N+1)

[75] Inventor: Hiroyuki Kawasaki, Hamamatsu, Japan

[73] Assignee: Kokochi Sangyo Co., Ltd., Shizuoka, Japan

[21] Appl. No.: 544,474

[22] Filed: Oct. 18, 1995

[30] Foreign Application Priority Data

Oct. 31, 1994 [JP] Japan .................................... 6-290474

[51] Int. Cl.[6] ........................................................ G06F 7/00

[52] U.S. Cl. ..................................... 364/746.2; 364/746.1

[58] Field of Search ................................ 364/746.2, 748, 364/761, 786, 736, 751, 745, 748.06, 724.2, 724.18, 746, 746.1

[56] References Cited

U.S. PATENT DOCUMENTS

| | | | |
|---|---|---|---|
| 4,110,831 | 8/1978 | Langdon, Jr. | 364/745 |
| 4,229,801 | 10/1980 | Whipple | 364/748 |
| 4,488,252 | 12/1984 | Vassar | 364/748 |
| 4,758,972 | 7/1988 | Frazier | 364/745 |
| 4,866,655 | 9/1989 | Nisiyama et al. | 364/761 |
| 4,979,140 | 12/1990 | Darley | 364/786 |
| 5,031,136 | 7/1991 | Nishiyama et al. | 364/746.2 |
| 5,243,551 | 9/1993 | Knowles et al. | 364/750.5 |
| 5,267,186 | 11/1993 | Gupta et al. | 364/748 |
| 5,317,755 | 5/1994 | Hartley et al. | 395/800 |

OTHER PUBLICATIONS

Scott, *Computer Number Systems and Arithmetic*, 1985, pp. 198–201.

Walter C. Lanning, "Negative Radix . . . Binary Implementation", Information and Control, pp. 271–285, Jan. 1977.

*Primary Examiner*—Thomas C. Lee

*Assistant Examiner*—Marc McDieunel

*Attorney, Agent, or Firm*—Flynn, Thiel, Boutell & Tanis, P.C.

[57] ABSTRACT

A central processing unit and a digital data processing system for performing arithmetic processing of numbers that are not presented using traditional 10 radix signed digits 0, 1, 2 . . . 9. The central processing unit and digital data processing system of this invention are configured to process numbers that are from a set of digits $\{X_1, X_2 \ldots X_{2n+1}\}$ wherein each of these digits represents a number between −n, . . . −1, 0, 1, . . . n such that n is an integer and n≧1. Thus, for any number that comprises more than one digit the most significant digit represents both magnitude and positive/negative state of the number and the remaining least significant digits each have a radix of (2n+1).

4 Claims, 34 Drawing Sheets

| DECIMAL NUMBERS | a TERNARY NUMBERS (n = 1) | b ENNEAD NUMBERS (n = 4) | c 27 SCALE NUMBER SYSTEM (n = 13) |
|---|---|---|---|
| -13 | | | N |
| -12 | | | O |
| -11 | | | P |
| -10 | | | Q |
| -9 | | | R |
| -8 | | | S |
| -7 | | | T |
| -6 | | | U |
| -5 | | | V |
| -4 | | ④ | W |
| -3 | | ③ | X |
| -2 | | ② | Y |
| -1 | W | ① | Z |
| 0 | x | 0 | φ |
| 1 | Y | 1 | A |
| 2 | | 2 | B |
| 3 | | 3 | C |
| 4 | | 4 | D |
| 5 | | | E |
| 6 | | | F |
| 7 | | | G |
| 8 | | | H |
| 9 | | | I |
| 10 | | | J |
| 11 | | | K |
| 12 | | | L |
| 13 | | | M |

Fig. 1

| DECIMAL NUMBERS | a<br>TERNARY NUMBERS (n = 1) | b<br>ENNEAD NUMBERS (n = 4) | c<br>27 SCALE NUMBER SYSTEM (n = 13) |
|---|---|---|---|
| -13 | | | N |
| -12 | | | O |
| -11 | | | P |
| -10 | | | Q |
| -9 | | | R |
| -8 | | | S |
| -7 | | | T |
| -6 | | | U |
| -5 | | | V |
| -4 | | ④ | W |
| -3 | | ③ | X |
| -2 | | ② | Y |
| -1 | W | ① | Z |
| 0 | x | 0 | φ |
| 1 | Y | 1 | A |
| 2 | | 2 | B |
| 3 | | 3 | C |
| 4 | | 4 | D |
| 5 | | | E |
| 6 | | | F |
| 7 | | | G |
| 8 | | | H |
| 9 | | | I |
| 10 | | | J |
| 11 | | | K |
| 12 | | | L |
| 13 | | | M |

Fig. 2

| DECIMAL NUMBERS | d BINARY NUMBERS (COMPLEMENT OF 2) | a TERNARY NUMBERS (n = 1) | b ENNEAD NUMBERS (n = 4) | c 27SCALE NOTATIONS (n = 13) |
|---|---|---|---|---|
| −20 | 11101100 | WYWY | ②② | ZG |
| −19 | 11101101 | WYxW | ②① | ZH |
| −18 | 11101110 | WYxx | ②0 | ZI |
| −17 | 11101111 | WYxY | ②1 | ZJ |
| −16 | 11110000 | WYYW | ②2 | ZK |
| −15 | 11110001 | WYYx | ②3 | ZL |
| −14 | 11110010 | WYYY | ②4 | ZM |
| −13 | 11110011 | WWW | ①④ | N |
| −12 | 11110100 | WWx | ①③ | O |
| −11 | 11110101 | WWY | ①② | P |
| −10 | 11110110 | WxW | ①① | Q |
| −9 | 11110111 | Wxx | ①0 | R |
| −8 | 11111000 | WxY | ①1 | S |
| −7 | 11111001 | WYW | ①2 | T |
| −6 | 11111010 | WYx | ①3 | U |
| −5 | 11111011 | WYY | ①4 | V |
| −4 | 11111100 | WW | ④ | W |
| −3 | 11111101 | Wx | ③ | X |
| −2 | 11111110 | WY | ② | Y |
| −1 | 11111111 | W | ① | Z |
| 0 | 00000000 | x | 0 | φ |
| 1 | 00000001 | Y | 1 | A |
| 2 | 00000010 | YW | 2 | B |
| 3 | 00000011 | Yx | 3 | C |
| 4 | 00000100 | YY | 4 | D |
| 5 | 00000101 | YWW | 1④ | E |
| 6 | 00000110 | YWx | 1③ | F |
| 7 | 00000111 | YWY | 1② | G |
| 8 | 00001000 | YxW | 1① | H |
| 9 | 00001001 | Yxx | 10 | I |
| 10 | 00001010 | YxY | 11 | J |
| 11 | 00001011 | YYW | 12 | K |
| 12 | 00001100 | YYx | 13 | L |
| 13 | 00001101 | YYY | 14 | M |
| 14 | 00001110 | YWWW | 2④ | AN |
| 15 | 00001111 | YWWx | 2③ | AO |
| 16 | 00010000 | YWWY | 2② | AP |
| 17 | 00010001 | YWxW | 2① | AQ |
| 18 | 00010010 | YWxx | 20 | AR |
| 19 | 00010011 | YWxY | 21 | AS |
| 20 | 00010100 | YWYW | 22 | AT |

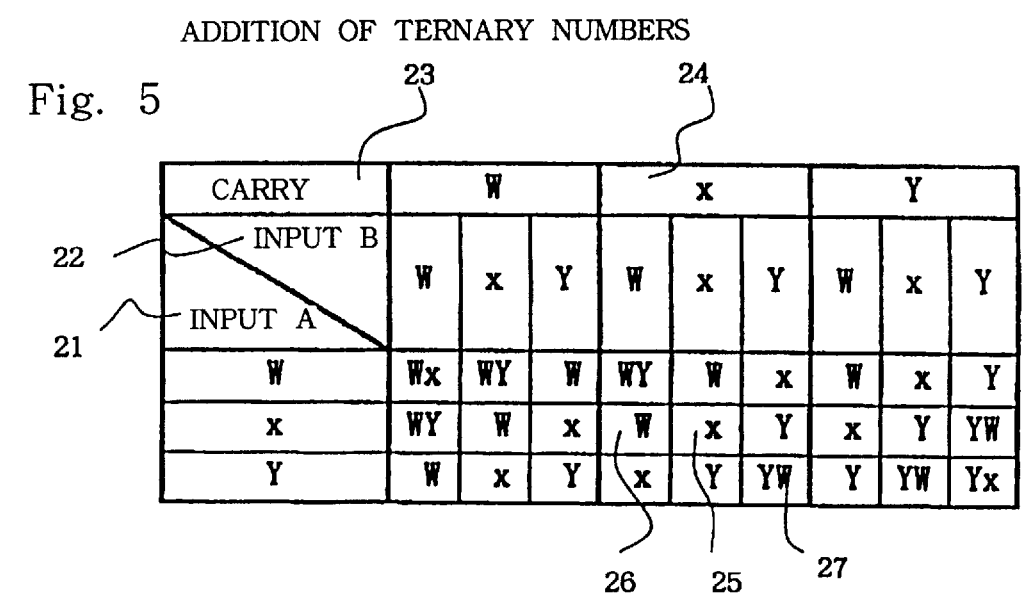

ADDITION OF TERNARY NUMBERS

Fig. 5

| CARRY | W | | | x | | | Y | | |
|---|---|---|---|---|---|---|---|---|---|
| INPUT B / INPUT A | W | x | Y | W | x | Y | W | x | Y |
| W | Wx | WY | W | WY | W | x | W | x | Y |
| x | WY | W | x | W | x | Y | x | Y | YW |
| Y | W | x | Y | x | Y | YW | Y | YW | Yx |

MULTIPLICATION OF TERNARY NUMBERS

| INPUT B / INPUT A | W | x | Y |
|---|---|---|---|
| W | Y | x | W |
| x | x | x | x |
| Y | W | x | Y |

Fig. 7

ADDITION OF ENNEAD NUMBERS

| CARRY | INPUT B / INPUT A | ④ | ③ | ② | ① | 0 | 1 | 2 | 3 | 4 |
|---|---|---|---|---|---|---|---|---|---|---|
| | ④ | ①0 | ①1 | ①2 | ①3 | ①4 | ④ | ③ | ② | ① |
| | ③ | ①1 | ①2 | ①3 | ①4 | ④ | ③ | ② | ① | 0 |
| | ② | ①2 | ①3 | ①4 | ④ | ③ | ② | ① | 0 | 1 |
| | ① | ①3 | ①4 | ④ | ③ | ② | ① | 0 | 1 | 2 |
| ① | 0 | ①4 | ④ | ③ | ② | ① | 0 | 1 | 2 | 3 |
| | 1 | ④ | ③ | ② | ① | 0 | 1 | 2 | 3 | 4 |
| | 2 | ③ | ② | ① | 0 | 1 | 2 | 3 | 4 | 1④ |
| | 3 | ② | ① | 0 | 1 | 2 | 3 | 4 | 1④ | 1③ |
| | 4 | ① | 0 | 1 | 2 | 3 | 4 | 1④ | 1③ | 1② |
| | ④ | ①1 | ①2 | ①3 | ①4 | ④ | ③ | ② | ① | 0 |
| | ③ | ①2 | ①3 | ①4 | ④ | ③ | ② | ① | 0 | 1 |
| | ② | ①3 | ①4 | ④ | ③ | ② | ① | 0 | 1 | 2 |
| | ① | ①4 | ④ | ③ | ② | ① | 0 | 1 | 2 | 3 |
| 0 | 0 | ④ | ③ | ② | ① | 0 | 1 | 2 | 3 | 4 |
| | 1 | ③ | ② | ① | 0 | 1 | 2 | 3 | 4 | 1④ |
| | 2 | ② | ① | 0 | 1 | 2 | 3 | 4 | 1④ | 1③ |
| | 3 | ① | 0 | 1 | 2 | 3 | 4 | 1④ | 1③ | 1② |
| | 4 | 0 | 1 | 2 | 3 | 4 | 1④ | 1③ | 1② | 1① |
| | ④ | ①2 | ①3 | ①4 | ④ | ③ | ② | ① | 0 | 1 |
| | ③ | ①3 | ①4 | ④ | ③ | ② | ① | 0 | 1 | 2 |
| | ② | ①4 | ④ | ③ | ② | ① | 0 | 1 | 2 | 3 |
| | ① | ④ | ③ | ② | ① | 0 | 1 | 2 | 3 | 4 |
| 1 | 0 | ③ | ② | ① | 0 | 1 | 2 | 3 | 4 | 1④ |
| | 1 | ② | ① | 0 | 1 | 2 | 3 | 4 | 1④ | 1③ |
| | 2 | ① | 0 | 1 | 2 | 3 | 4 | 1④ | 1③ | 1② |
| | 3 | 0 | 1 | 2 | 3 | 4 | 1④ | 1③ | 1② | 1① |
| | 4 | 1 | 2 | 3 | 4 | 1④ | 1③ | 1② | 1① | 10 |

Fig. 8 MULTIPLICATION OF ENNEAD NUMBERS

| INPUT B / INPUT A | ④ | ③ | ② | ① | 0 | 1 | 2 | 3 | 4 |
|---|---|---|---|---|---|---|---|---|---|
| ④ | 2② | 1 3 | 1① | 4 | 0 | ④ | ①1 | ①③ | ②2 |
| ③ | 1 3 | 1 0 | 1③ | 3 | 0 | ③ | ①3 | ①0 | ①③ |
| ② | 1① | 1③ | 4 | 2 | 0 | ② | ④ | ①3 | ①1 |
| ① | 4 | 3 | 2 | 1 | 0 | ① | ② | ③ | ④ |
| 0 | 0 | 0 | 0 | 0 | 0 | 0 | 0 | 0 | 0 |
| 1 | ④ | ③ | ② | ① | 0 | 1 | 2 | 3 | 4 |
| 2 | ①1 | ①3 | ④ | ② | 0 | 2 | 4 | 1③ | 1① |
| 3 | ①③ | ①0 | ①3 | ③ | 0 | 3 | 1③ | 1 0 | 1 3 |
| 4 | ②2 | ①③ | ①1 | ④ | 0 | 4 | 1① | 1 3 | 2② |

```
2 x 3 =      Y W
6         x) Y x
           -------
           Y W x
```

```
6 x 4 =      Y W x
24        x) Y Y
          --------
             Y W
           Y W
          --------
           Y x W x
```

```
24 x 5 =      Y x W x
120        x) Y W W
           ----------
                W x Y   36
              W x Y     37
            Y x W       38
           ----------
            x Y Y Y Y x
```

```
120 x 6 =     Y Y Y Y x
720        x)     Y W x
           -------------
              W W W W
           Y Y Y Y
           -------------
           Y x x x W x x
```

```
720 x 7 =     Y x x x W x x
5040       x)     Y W Y
           -----------------
              Y x x x W
            W x x x Y
          Y x x x W
          -----------------
          Y W Y x W Y W x x
```

```
5040 x 8 =      Y W Y x W Y W x x      31
40320        x)             Y x W      32
             -------------------
                W Y W x Y W Y          33
            Y W Y x W Y W              34
            -----------------------
            Y W x x Y Y x W Y x x      35
```

```
40320 x 9 =  Y W x x Y Y x W Y x x
362880    x)                 Y x x
          -------------------------
             Y W x x Y Y x W Y x x x x
```

```
    Y W x x Y Y x W Y x x x x
 x)                 Y x Y
    Y W x x Y Y x W Y
  Y W x x Y Y x W Y
  Y W Y W Y Y Y x Y W Y x x x x
```

```
     Y W Y W Y Y Y x Y W Y x x x x
  x)                     Y Y W
     W Y W Y W W W x W Y W
   Y W Y W Y Y Y x Y W Y
 Y W Y W Y Y Y x Y W Y
 Y x W Y x x Y x x x x W W x x x x
```

```
   Y x W Y x x Y x x x x W W x x x x
 x)                        Y Y x
   Y x W Y x x Y x x x x W W
 Y x W Y x x Y x x x x W W
 Y Y W x Y x Y Y x x W Y Y W x x x x x
```

```
      Y Y W x Y x Y Y x x W Y Y W x x x x x
    x)                      Y Y Y
      Y Y W x Y x Y Y x x W Y Y W
    Y Y W x Y x Y Y x x W Y Y W
  Y Y W x Y x Y Y x x W Y Y W
 Y W W Y x Y W x x W Y W x Y Y x W x x x x x
```

| INTEGER | | FACTORIAL | | | |
|---|---|---|---|---|---|
| DECIMAL NUMBERS | TERNARY NUMBERS (n = 1) | DECIMAL NUMBERS (e) | TERNARY NUMBERS (n = 1) (a) | ENNEAD NUMBERS (n = 4) (b) | 27SCALR NOTATION (n = 13) (c) |
| 2 | YW | 2 | YW | 2 | B |
| 3 | Yx | 6 | YWx | 1③ | F |
| 4 | YY | 24 | YxWx | 3③ | A X |
| 5 | YWW | 120 | YYYYx | 1 4 3 | D L |
| 6 | YWx | 720 | YxxxWxx | 1 0①0 | A ϕ R |
| 7 | YWY | 5040 | YWYxWYWxx | 1②①2 0 | G Y R |
| 8 | YxW | 40320 | YWxxYYxWYxx | 1③1 3②0 | B A H I |
| 9 | Yxx | 362880 | YWxxYYxWYxxxx | 1③1 3②0 0 | A R L U ϕ |
| 1 0 | YxY | 3628800 | YWYWYYYxYWYxxxx | 1②②4 1②0 0 | G V J U ϕ |
| 1 1 | YYW | 39916800 | YxWYxxYxxxxWWxxxx | 1①3 1 0 0④0 0 | C U C ϕ O ϕ |
| 1 2 | YYx | 479001600 | YYWxYxYYxxWYYWxxxxx | 1 2 1 1 3①4③0 0 | A F J I V R ϕ |
| 1 3 | YYY | 6227020800 | YWWYxYWxxWYWxYYxWxxxxx | 2②1③①2 1 3③0 0 | A P B Z F L R ϕ |

Figures 12A, 12B:
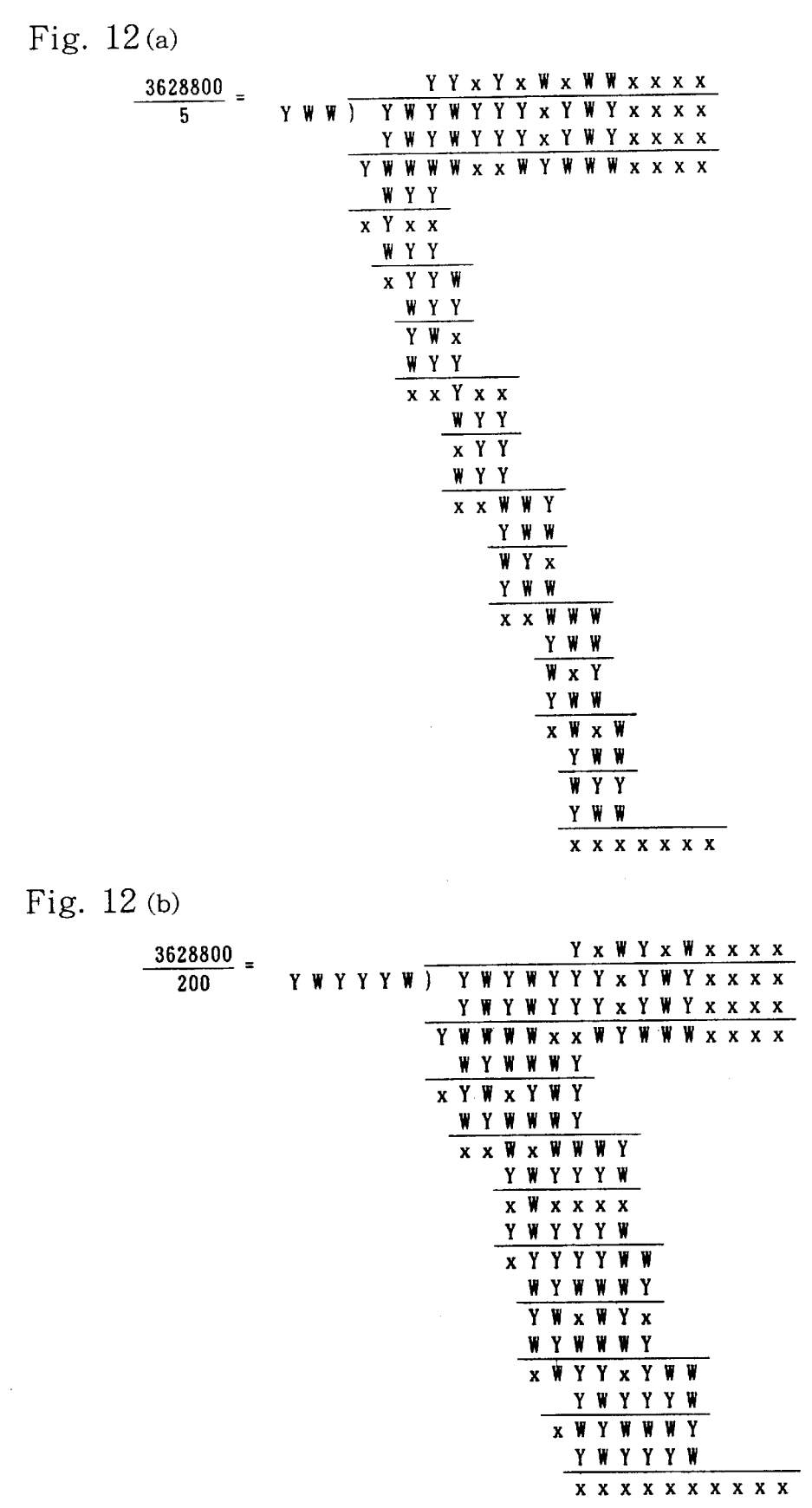

```
3628800
------- =              Y Y x Y x W x W W x x x x
   5           Y W W ) Y W Y W Y Y Y x Y W Y x x x x
                       Y W Y W Y Y Y x Y W Y x x x x
                     Y W W W W x x W Y W W W x x x x
                       W Y Y
                     x Y x x
                       W Y Y
                       x Y Y W
                         W Y Y
                         Y W x
                         W Y Y
                         x x Y x x
                             W Y Y
                             x Y Y
                             W Y Y
                             x x W W Y
                                 Y W W
                                 W Y x
                                 Y W W
                                 x x W W W
                                     Y W W
                                     W x Y
                                     Y W W
                                     x W x W
                                       Y W W
                                       W Y Y
                                       Y W W
                                       x x x x x x x
```

```
3628800
------- =                  Y x W Y x W x x x x
  200       Y W Y Y Y W ) Y W Y W Y Y Y x Y W Y x x x x
                          Y W Y W Y Y Y x Y W Y x x x x
                        Y W W W W x x W Y W W W x x x x
                          W Y W W W Y
                        x Y W x Y W Y
                          W Y W W W Y
                          x x W x W W W Y
                              Y W Y Y Y W
                              x W x x x x
                              Y W Y Y Y W
                              x Y Y Y Y W W
                                W Y W W W Y
                                Y W x W Y x
                                W Y W W W Y
                                x W Y Y x Y W W
                                    Y W Y Y Y W
                                  x W Y W W W Y
                                    Y W Y Y Y W
                                    x x x x x x x x x x
```

Figures 13F, 13G:
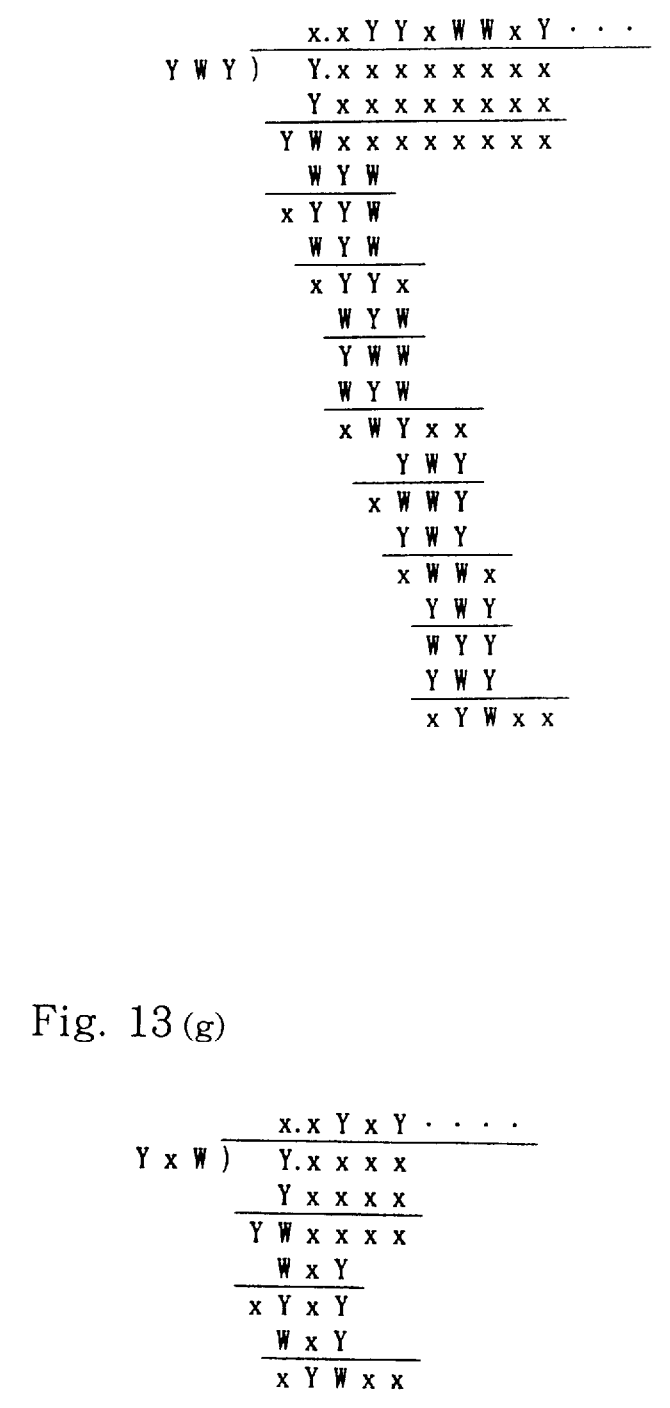

```
           x.x Y Y x W W x Y · · ·
 Y W Y )   Y.x x x x x x x x x
           Y x x x x x x x x
         Y W x x x x x x x x x
           W Y W
         x Y Y W
           W Y W
           x Y Y x
             W Y W
             Y W W
             W Y W
             x W Y x x
                 Y W Y
               x W W Y
                 Y W Y
                 x W W x
                   Y W Y
                   W Y Y
                   Y W Y
                   x Y W x x
```

```
           x.x Y x Y · · · ·
 Y x W )   Y.x x x x
           Y x x x x
         Y W x x x x
           W x Y
         x Y x Y
           W x Y
           x Y W x x
```

| DECIMAL NUMBERS | TERNARY NUMBERS (n = 1) | RECIPROCALS | | THE NUMBER OF DIGITS OF RECURRING SECTION IN THE TERNARY NOTATION SYSTEM |
|---|---|---|---|---|
| INTEGER | | DECIMAL NUMBERS | TERNARY NUMBERS (n = 1) | |
| 2 | YW | 0.5 | x.Ẏ | 1 |
| 3 | Yx | 0.3̇ | x.Y | 0 |
| 4 | YY | 0.25 | x.ẎẆ | 2 |
| 5 | YWW | 0.2 | x.ẎWWẎ | 4 |
| 6 | YWx | 0.16̇ | x.xẎ | 1 |
| 7 | YWY | 0.1̇42857̇ | x.xẎYxWWẋ | 6 |
| 8 | YxW | 0.125 | x.xYx | 2 |
| 9 | Yxx | 0.1̇ | x.xY | 0 |
| 10 | YxY | 0.1 | x.xẎxẆx | 4 |
| 11 | YYW | 0.0̇90̇ | x.xẎWYẎx | 5 |
| 12 | YYx | 0.083̇ | x.xYW | 2 |
| 13 | YYY | 0.0̇76923̇0 | x.xẎWẋ | 3 |
| 14 | YWWW | 0.0̇71428̇5 | x.xẎWxWẎx | 6 |
| 15 | YWWx | 0.06̇ | x.xYWWY | 4 |
| 16 | YWWY | 0.0625 | x.xẎWWẋ | 4 |
| 17 | YWxW | 0.0̇588235294··· | x.xẎWWWYxWxWYYẎWxẎx | 16 |
| 18 | YWxx | 0.05̇ | x.xxY | 1 |
| 19 | YWxY | 0.0̇526315789··· | x.xxẎYYWYxYxxWWWYWxẆxx | 18 |
| 20 | YWYW | 0.05 | x.xxẎYxx | 4 |
| 21 | YWYx | 0.0̇476190̇ | x.xxẎYxWWx | 6 |
| 22 | YWYY | 0.045̇ | x.xxẎYWxx | 5 |
| 23 | YxWW | 0.0̇434782608··· | x.xxẎYWWWxYWYxx | 11 |
| 24 | YxWx | 0.0416̇ | x.xxYx | 2 |
| 25 | YxWY | 0.04 | x.xxẎxYWxYYYxxWxWYxWWWxẋ | 20 |
| 26 | YxxW | 0.0384615̇ | x.xxẎxx | 3 |
| 27 | Yxxx | 0.03̇70̇ | x.xxY | 0 |

4 DIGITS

Fig. 16 (b)

Y.YYW
YYY

YW.xWx
YY

YW.xxY
W

YW.xxx

5 DIGITS

Fig. 16 (c)

Y.YYWY
YYYW

YW.xWxx
YYY

YW.xxYY
WW

YW.xxxx
Y

YW.xxxY

6 DIGITS

Fig. 16 (d)

Y.YYWYW
YYYWY

YW.xWxxx
YYYW

YW.xxYYW
WWW

YW.xxxWY
YY

YW.xxxYW
W

YW.xxxxY

7 DIGITS

Fig. 16 (e)

Y.YYWYWW
YYYWYW

YW.xWxxWY
YYYWY

YW.xxYYWW
WWWY

YW.xxxWYx
YYY

YW.xxxYWY
WW

YW.xxxxYx
W

YW.xxxxYW

8 DIGITS

Fig. 16 (f)

Y.YYWYWWx
YYYWYWW

YW.xWxxWYW
YYYWYW

YW.xxYxYYY
WWWYW

YW.xxxWYWx
YYYW

YW.xxxYWxW
WWW

YW.xxxxxYY
WW

YW.xxxxxxx

9 DIGITS

Fig. 16 (g)

Y.YYWYWWxx
YYYWYWWx

YW.xWxxWYWx
YYYWYWW

YW.xxYxYYYW
WWWYWY

YW.xxxWYWxx
YYYWY

YW.xxxYWxWY
WWWY

YW.xxxxYWWW
WWW

YW.xxxxxxxY

10 DIGITS

Fig. 16 (h)

Y.YYWYWWxxW
YYYWYWWxx

YW.xWxxWYWxW
YYYWYWWx

YW.xxYxYYYWW
WWWYWYY

YW.xxxWYWxxx
YYYWYW

YW.xxxYWxWYW
WWWYW

YW.xxxxxYYYY
WWWY

YW.xxxxxxxYW
W

YW.xxxxxxxxY

11 DIGITS

Fig. 16 (i)

Y.YYWYWWxxWx
YYYWYWWxxW

YW.xWxxWYWxWW
YYYWYWWxx

YW.xxYxYYYWWW
WWWYWYYx

YW.xxxWYWxxxW
YYYWYWW

YW.xxxYWxWxYY
WWWYWY

YW.xxxxxYYYYW
WWWYW

YW.xxxxxxxxYY
WW

YW.xxxxxxxxxx

12 DIGITS

Fig. 16 (j)

Y.YYWYWWxxWxx
YYYWYWWxxWx

YW.xWxxWYWxWWx
YYYWYWWxxW

YW.xxYxYYYWWWW
WWWYWYYxx

YW.xxxWYWxxxWW
YYYWYWWx

YW.xxxYWxWxYYW
WWWYWYY

YW.xxxxxYYYYWx
WWWYWY

YW.xxxxxxxxYYY
WWW

YW.xxxxxxxxxxx

13 DIGITS

Fig. 16 (k)

Y. YYWYWWxxWxxW
YYYWYWWxxWxx

YW. xWxxWYWxWWxW
YYYWYWWxxWx

YW. xxYxYYYWWWWW
WWWYWYYxxY

YW. xxxWYWxxxWWx
YYYWYWWxx

YW. xxxYWxWxYYWx
WWWYWYYx

YW. xxxxxYYYYWxx
WWWYWYY

YW. xxxxxxxxYYYY
WWWY

YW. xxxxxxxxxxYW
W

YW. xxxxxxxxxxxY 1 4 DIGITS

Fig. 16 (l)

Y. YYWYWWxxWxxWx
YYYWYWWxxWxxW

YW. xWxxWYWxWWxWW
YYYWYWWxxWxx

YW. xxYxYYYWWWWWW
WWWYWYYxxYx

YW. xxxWYWxxxWWxW
YYYWYWWxxW

YW. xxxYWxWxYYWWY
WWWYWYYxx

YW. xxxxxYYYYWxWY
WWWYWYYx

YW. xxxxxxxxYYYxY
WWWYW

YW. xxxxxxxxxxxYx
WW

YW. xxxxxxxxxxxxW

15 DIGITS

Fig. 16 (m)

Y. YYWYWWxxWxxWxY
YYYWYWWxxWxxWx

YW. xWxxWYWxWWxWWY
YYYWYWWxxWxxW

YW. xxYxYYYWWWWWWx
WWWYWYYxxYxx

YW. xxxWYWxxxWWxWx
YYYWYWWxxWx

YW. xxxYWxWxYYWWYx
WWWYWYYxxY

YW. xxxxxYYYYWxWYY
WWWYWYYxx

YW. xxxxxxxxYYYxYY
WWWYWY

YW. xxxxxxxxxxxYYW
WWW

YW. xxxxxxxxxxxxWY
Y

YW. xxxxxxxxxxxxxW 1 6 DIGITS

Fig. 16 (n)

Y. YYWYWWxxWxxWxYW
YYYWYWWxxWxxWxY

YW. xWxxWYWxWWxWWYx
YYYWYWWxxWxxWx

YW. xxYxYYYWWWWWWxx
WWWYWYYxxYxxY

YW. xxxWYWxxxWWxWxY
YYYWYWWxxWxx

YW. xxxYWxWxYYWWYxY
WWWYWYYxxYx

YW. xxxxxYYYYWxWYYY
WWWYWYYxxY

YW. xxxxxxxxYYYYWWW
WWWYWYY

YW. xxxxxxxxxxxYYxx
WWWY

YW. xxxxxxxxxxxxxWY
YY

YW. xxxxxxxxxxxxxYW
W

YW. xxxxxxxxxxxxxxY 1 7 DIGITS

Fig. 17 (a)

Y. YYWYWWxxWxxWxYWx
YYYWYWWxxWxxWxYW

YW. xWxxWYWxWWxWWYxW
YYYWYWWxxWxxWxY

YW. xxYxYYYWWWWWWxxx
WWWYWYYxxYxxYx

YW. xxxWYWxxxWWxWxYx
YYYWYWWxxWxxW

YW. xxxYWxWxYYWWYxYW
WWWYWYYxxYxx

YW. xxxxxYYYYWxWYYYW
WWWYWYYxxYx

YW. xxxxxxxxYYYYWWWW
WWWYWYYx

YW. xxxxxxxxxxxYYxxW
WWWYW

YW. xxxxxxxxxxxxxWxY
YYY

YW. xxxxxxxxxxxxxYWW
WW

YW. xxxxxxxxxxxxxxxY 1 8 DIGITS

Fig. 17 (b)

Y. YYWYWWxxWxxWxYWxW
YYYWYWWxxWxxWxYWx

YW. xWxxWYWxWWxWWYxWW
YYYWYWWxxWxxWxYW

YW. xxYxYYYWWWWWWxxWY
WWWYWYYxxYxxYxW

YW. xxxWYWxxxWWxWxYWx
YYYWYWWxxWxxWx

YW. xxxYWxWxYYWWYxxYx
WWWYWYYxxYxxY

YW. xxxxxYYYYWxWYYxYY
WWWYWYYxxYxx

YW. xxxxxxxxYYYxYYYYY
WWWYWYYxx

YW. xxxxxxxxxxxYYxWYY
WWWYWY

YW. xxxxxxxxxxxxxWxYW
YYYW

YW. xxxxxxxxxxxxxxYYY
WWW

YW. xxxxxxxxxxxxxxxxx
W

YW. xxxxxxxxxxxxxxxxW 1 9 DIGITS

Fig. 17 (c)

Y. YYWYWWxxWxxWxYWxWx
YYYWYWWxxWxxWxYWxW

YW. xWxxWYWxWWxWWYxWWW
YYYWYWWxxWxxWxYWx

YW. xxYxYYYWWWWWWxxWYW
WWWYWYYxxYxxYxWY

YW. xxxWYWxxxWWxWxYWxx
YYYWYWWxxWxxWxY

YW. xxxYWxWxYYWWYxxYxY
WWWYWYYxxYxxYx

YW. xxxxxYYYYWxWYYxYYY
WWWYWYYxxYxxY

YW. xxxxxxxxYYYYWWWWWW
WWWYWYYxxY

YW. xxxxxxxxxxxYYxxWWx
WWWYWYY

YW. xxxxxxxxxxxxxWxYxY
YYYWY

YW. xxxxxxxxxxxxxYWWxW
WWWY

YW. xxxxxxxxxxxxxxxYWx
WW

YW. xxxxxxxxxxxxxxxxYW 2 0 DIGITS

Fig. 17 (d)

Y. YYWYWWxxWxxWxYWxWxx
YYYWYWWxxWxxWxYWxWx

YW. xWxxWYWxWWxWWYxWWWx
YYYWYWWxxWxxWxYWxW

YW. xxYxYYYWWWWWWxxWYWW
WWWYWYYxxYxxYxWYx

YW. xxxWYWxxxWWxWxYWxxW
YYYWYWWxxWxxWxYW

YW. xxxYWxWxYYWWYxxYxxY
WWWYWYYxxYxxYxW

YW. xxxxxYYYYWxWYYxYYxx
WWWYWYYxxYxxYx

YW. xxxxxxxxYYYxYYYYYYx
WWWYWYYxxYx

YW. xxxxxxxxxxxYYxxWWWx
WWWYWYYx

YW. xxxxxxxxxxxxxWxYxxx
YYYWYW

YW. xxxxxxxxxxxxxYWWWYW
WWWYW

YW. xxxxxxxxxxxxxxxxYYY
WWW

YW. xxxxxxxxxxxxxxxxxxx 2 1 DIGITS

Fig. 17 (e)

Y.YYWYWWxxWxxWxYWxWxxW
YYYWYWWxxWxxWxYWxWxx

---

YW.xWxxWYWxWWxWWYxWWWxW
YYYWYWWxxWxxWxYWxWx

---

YW.xxYxYYYWWWWWWxxWYWWW
WWWYWYYxxYxxYxWYxY

---

YW.xxxWYWxxxWWxWxYWxxWx
YYYWYWWxxWxxWxYWx

---

YW.xxxYWxWxYYWWYxxYxxYx
WWWYWYYxxYxxYxWY

---

YW.xxxxxYYYYWxWYYxYYxxY
WWWYWYYxxYxxYxW

---

YW.xxxxxxxxYYYxYYYYYYxx
WWWYWYYxxYxx

---

YW.xxxxxxxxxxxYYxxWWWxx
WWWYWYYxx

---

YW.xxxxxxxxxxxxxWxYxxxx
YYYWYWW

---

YW.xxxxxxxxxxxxxYWWWYWW
WWWYWY

---

YW.xxxxxxxxxxxxxxxxYYYx
WWWY

---

YW.xxxxxxxxxxxxxxxxxxxY
W

---

YW.xxxxxxxxxxxxxxxxxxxx 2 2 DIGITS

Fig. 17 (f)

Y.YYWYWWxxWxxWxYWxWxxWx
YYYWYWWxxWxxWxYWxWxxW

---

YW.xWxxWYWxWWxWWYxWWWxWW
YYYWYWWxxWxxWxYWxWxx

---

YW.xxYxYYYWWWWWWxxWYWWWW
WWWYWYYxxYxxYxWYxYx

---

YW.xxxWYWxxxWWxWxYWxxWxW
YYYWYWWxxWxxWxYWxW

---

YW.xxxYWxWxYYWWYxxYxxYWY
WWWYWYYxxYxxYxWYx

---

YW.xxxxxYYYYWxWYYxYYxxxY
WWWYWYYxxYxxYxWY

---

YW.xxxxxxxxYYYxYYYYYYxxW
WWWYWYYxxYxxY

---

YW.xxxxxxxxxxxYYxxWWWxxx
WWWYWYYxxY

---

YW.xxxxxxxxxxxxxWxYxxxxY
YYYWYWWx

---

YW.xxxxxxxxxxxxxYWWWYWWY
WWWYWYY

---

YW.xxxxxxxxxxxxxxxxYYYYW
WWWYW

---

YW.xxxxxxxxxxxxxxxxxxxYY
WW

---

YW.xxxxxxxxxxxxxxxxxxxxx 2 3 DIGITS

Fig. 18 (a)

Y. YYWYWWxxWxxWxYWxWxxWxx
YYYWYWWxxWxxWxYWxWxxWx

YW. xWxxWYWxWWxWWYxWWWxWWx
YYYWYWWxxWxxWxYWxWxxW

YW. xxYxYYYWWWWWWxxWYWWWWW
WWWYWYYxxYxxYxWYxYxx

YW. xxxWYWxxxWWxWxYWxxWxWW
YYYWYWWxxWxxWxYWxWx

YW. xxxYWxWxYYWWYxxYxxYWYW
WWWYWYYxxYxxYxWYxY

YW. xxxxxYYYYWxWYYxYYxxxYx
WWWYWYYxxYxxYxWYx

YW. xxxxxxxxYYYxYYYYYYxxWx
WWWYWYYxxYxxYx

YW. xxxxxxxxxxxYYxxWWWxxxx
WWWYWYYxxYx

YW. xxxxxxxxxxxxxWxYxxxxYx
YYYWYWWxx

YW. xxxxxxxxxxxxxYWWWYWWYx
WWWYWYYx

YW. xxxxxxxxxxxxxxxxYYYYWx
WWWYWY

YW. xxxxxxxxxxxxxxxxxxxYYY
WWW

YW. xxxxxxxxxxxxxxxxxxxxxx 2 4 DIGITS

Fig. 18 (b)

Y. YYWYWWxxWxxWxYWxWxxWxxW
YYYWYWWxxWxxWxYWxWxxWxx

YW. xWxxWYWxWWxWWYxWWWxWWxW
YYYWYWWxxWxxWxYWxWxxWx

YW. xxYxYYYWWWWWWxxWYWWWWWW
WWWYWYYxxYxxYxWYxYxxY

YW. xxxWYWxxxWWxWxYWxxWxWWx
YYYWYWWxxWxxWxYWxWxx

YW. xxxYWxWxYYWWYxxYxxYWYWx
WWWYWYYxxYxxYxWYxYx

YW. xxxxxYYYYWxWYYxYYxxxYxx
WWWYWYYxxYxxYxWYxY

YW. xxxxxxxxYYYxYYYYYYxxWxY
WWWYWYYxxYxxYxW

YW. xxxxxxxxxxxYYxxWWWxxxxx
WWWYWYYxxYxx

YW. xxxxxxxxxxxxxWxYxxxxYxx
YYYWYWWxxW

YW. xxxxxxxxxxxxxYWWWYWWYxW
WWWYWYYxx

YW. xxxxxxxxxxxxxxxxYYYYWxW
WWWYWYY

YW. xxxxxxxxxxxxxxxxxxxYYYx
WWWY

YW. xxxxxxxxxxxxxxxxxxxxxxY
W

YW. xxxxxxxxxxxxxxxxxxxxxxx 2 5 DIGITS

Fig. 18 (c)

Y. YYWYWWxxWxxWxYWxWxxWxxW
YYYWYWWxxWxxWxYWxWxxWxxW

YW. xWxxWYWxWWxWWYxWWWxWWxWW
YYYWYWWxxWxxWxYWxWxxWxx

YW. xxYxYYYWWWWWWxxWYWWWWWWW
WWWYWYYxxYxxYxWYxYxxYx

YW. xxxWYWxxxWWxWxYWxxWxWWxW
YYYWYWWxxWxxWxYWxWxxW

YW. xxxYWxWxYYWWYxxYxxYWYWWY
WWWYWYYxxYxxYxWYxYxx

YW. xxxxxYYYYWxWYYxYYxxxYxWY
WWWYWYYxxYxxYxWYxYx

YW. xxxxxxxxYYYxYYYYYYxxWxxY
WWWYWYYxxYxxYxWY

YW. xxxxxxxxxxxYYxxWWWxxxxxW
WWWYWYYxxYxxY

YW. xxxxxxxxxxxxxWxYxxxxYxxx
YYYWYWWxxWx

YW. xxxxxxxxxxxxxYWWWYWWYxWx
WWWYWYYxxY

YW. xxxxxxxxxxxxxxxxYYYYWxWY
WWWYWYYx

YW. xxxxxxxxxxxxxxxxxxxYYYxY
WWWYW

YW. xxxxxxxxxxxxxxxxxxxxxxYx
WW

YW. xxxxxxxxxxxxxxxxxxxxxxxW 2 6 DIGITS

Fig. 18 (d)

Y. YYWYWWxxWxxWxYWxWxxWxxW
YYYWYWWxxWxxWxYWxWxxWxxW

YW. xWxxWYWxWWxWWYxWWWxWWxWW
YYYWYWWxxWxxWxYWxWxxWxxW

YW. xxYxYYYWWWWWWxxWYWWWWWWWW
WWWYWYYxxYxxYxWYxYxxYxx

YW. xxxWYWxxxWWxWxYWxxWxWWxWW
YYYWYWWxxWxxWxYWxWxxWx

YW. xxxYWxWxYYWWYxxYxxYWYWWYW
WWWYWYYxxYxxYxWYxYxxY

YW. xxxxxYYYYWxWYYxYYxxxYxWYx
WWWYWYYxxYxxYxWYxYxx

YW. xxxxxxxxYYYxYYYYYYxxWxxYx
WWWYWYYxxYxxYxWYx

YW. xxxxxxxxxxxYYxxWWWxxxxxWx
WWWYWYYxxYxxYx

YW. xxxxxxxxxxxxxWxYxxxxYxxxx
YYYWYWWxxWxx

YW. xxxxxxxxxxxxxYWWWYWWYxWxx
WWWYWYYxxYx

YW. xxxxxxxxxxxxxxxYYYYWxWYx
WWWYWYYxx

YW. xxxxxxxxxxxxxxxxxxxYYYxYx
WWWYWY

YW. xxxxxxxxxxxxxxxxxxxxxxYxY
WWW

YW. xxxxxxxxxxxxxxxxxxxxxxxxWx 2 7 DIGITS

Fig. 18 (e)

Y. YYWYWWxxWxxWxYWxWxxWxxW
YYYWYWWxxWxxWxYWxWxxWxxW

YW. xWxxWYWxWWxWWYxWWWxWWxWW
YYYWYWWxxWxxWxYWxWxxWxxW

YW. xxYxYYYWWWWWWxxWYWWWWWWWW
WWWYWYYxxYxxYxWYxYxxYxxY

YW. xxxWYWxxxWWxWxYWxxWxWWxWWY
YYYWYWWxxWxxWxYWxWxxWxx

YW. xxxYWxWxYYWWYxxYxxYWYWWYWY
WWWYWYYxxYxxYxWYxYxxYx

YW. xxxxxYYYYWxWYYxYYxxxYxWYxY
WWWYWYYxxYxxYxWYxYxxY

YW. xxxxxxxxYYYxYYYYYYxxWxxYYW
WWWYWYYxxYxxYxWYxY

YW. xxxxxxxxxxxYYxxWWWxxxxxWYx
WWWYWYYxxYxxYxW

YW. xxxxxxxxxxxxxWxYxxxxYxxxYW
YYYWYWWxxWxxW

YW. xxxxxxxxxxxxxYWWWYWWYxWxxY
WWWYWYYxxYxx

YW. xxxxxxxxxxxxxxxYYYYWxWYxY
WWWYWYYxxY

YW. xxxxxxxxxxxxxxxxxxxYYYxYYW
WWWYWYY

YW. xxxxxxxxxxxxxxxxxxxxxxYYWx
WWWY

YW. xxxxxxxxxxxxxxxxxxxxxxxxWYY 2 8 DIGITS

DIGITAL ARITHMETIC CALCULATOR AND DIGITAL COMPUTER USING NON-REDUNDANT (2N+1) NOTATION SYSTEM WITH A RADIX OF (2N+1)

BACKGROUND OF THE INVENTION 1. (Industrial Field of Application)

This invention relates to a CPU and electronic computer which makes calculations and information processing using digital signals, more particularly to a CPU and electronic computer which makes a computing operation equivalent to the decimal or binary notation or an alternative computing operation to enhance the computing accuracy and speed.

2. (Prior Art)

In the prior art, all of not only the electronic computers but also the digital signal processors for performing computing and information processing with digital signals use binary number consisting of two signals "0" and "1", to store data and make computation. All of the CPUs for making computation with decimal numbers make use of binary decimal numbers.

The decimal numbers in use for daily life are focused expressing positive numbers, so that many representations of negative numbers are often made by way of attaching them with negative sign (−) to the head of their absolute numbers or positive numbers.

Therefore, when making the four arithmetic operation, first the absolute values of negative numbers in which (−) signs are removed are obtained, and then calculations only limited to positive numbers are made, and finally (−) signs are attached as required. For this reason, positive numbers and negative numbers may be often subjected to different processing from each other.

In the binary number system, since different processings to be taken for positive and negative numbers are troublesome, many cases have uses the complement of 2 for negative numbers to make a single and same processing. This method would, however, have many digits other than zero when negative numbers are transformed into the complement of 2, if original numbers have a few significant digits. As a result, the less the significant digits, the longer time the calculation would take.

Further, when the calculations have a larger digit than necessary, a portion less than a certain place should be rounded off, but the round-off method and its error are varied depending on the notation system of numbers.

SUMMARY OF THE INVENTION

To solve the above problems, an object of the present invention is to provide a CPU and electronic computer which makes a computing operation equivalent to the decimal or binary notation system or an alternative computing operation to enhance the computing accuracy and speed.

To achieve the above object, a CPU of this invention is characterized in that a single digit is from one of a set of (2n+1) digits consisting of n pieces or digits (1 to n) of signals expressing positive integers; n pieces or digits (−1 to −n) of signals expressing negative integers; and one signal expressing zero. Computing is made using a number system of one or more digits expressed in the scale of (2n+1) notations where n is one or larger integer.

As described above, the CPU provides a new breakthrough computing method in which a number of a single digit is represented with one signal selected from (2n+1) pieces of signals consisting of n pieces (1 to n) of signals expressing positive integers; n pieces (−1 to −n) of signals expressing negative integers; and one signal expressing zero. And, computing is made using a number system of one or more digits expressed in the radix of (2n+1) where n is one or larger integer. Hereinafter, this number system may be called (2n+1) coded or scale number system.

Further, this embodiment can make use of the inherent features of the (2n+1) coded number system and its computing method, thus significantly enhancing computing accuracy and speed.

An electronic computer of this invention is characterized in that a number of a single digit is represented with one signal selected from (2n+1) pieces of signals consisting of n pieces or digits (1 to n) of signals expressing positive integers; n pieces or digits (−1 to −n) of signals expressing negative integers; and one signal expressing zero. The computer has a memory area for storing one or more digits of (2n+1) coded numbers where n is one or larger integer, and a CPU which, receiving one or more pieces of (2n+1) coded data fetched out of the memory area, outputs one or more pieces of processed (2n+1) coded data.

As described above, the computer has a number of a single digit with one signal selected from (2n+1) pieces of signals consisting of n pieces (1 to n) of signals expressing positive integers; n pieces (−1 to −n) of signals expressing negative integers; and one signal expressing zero. The computer has a memory area for storing one or more digits of (2n+1) coded numbers where n is one or larger integers, and a CPU which, receiving one or more pieces of (2n+1) coded data fetched out of the memory area, outputs one or more pieces of processed (2n+1) coded data, thus eliminating the need for changing the data notation scheme when copying/transferring data between the CPU and the memory, or permitting the data to be stored as the form of (2n+1) coded data is maintained, resulting in a faster operating speed and a higher accuracy of data.

An electronic computer of the above described processor consists of an integer processing section handling integer data and a fixed-point number processing section handling the fixed-point part of floating-point numerical data, and that the exponent part of the floating-point numerical data is processed in the integer processing section.

More particularly, the CPU and computer represent a number of single digits with one signal selected from (2n+1) pieces of signals, the set of digits $\{X_1, X_2 \ldots X_{2n+1}\}$, consisting of n pieces (1 to n) of signals expressing positive integers; n pieces (−1 to −n) of signals expressing negative integers; and one signal expressing zero. And, computing is made using the (2n+1) coded number system. If n equals 1, the scheme refers to ternary system. If 4, the scheme refers to ennead coded number scheme. If n=13, the scheme refers to 27 coded number scheme. It goes without saying that n is not limited to the above numbers, but must be an integer equal to or larger than 1, thereby allowing this number of (2n+1) to be a positive odd number equal to or larger than 3. As described previously, the notation scheme and arithmetic method of these types of numbers collectively refers to the (2n+1) coded system. Numbers expressed by the (2n+1) coded system are called as (2n+1) coded numbers or figures.

On the contrary, the conventional notation method represents a number of one digit by one notation selected from (n+1) pieces of notations totaling n pieces of notations expressing n pieces of positive integers (1 to n) and one notation expressing zero, so that it may be called (n+1) coded number scheme.

As compared to the above conventional (n+1) coded number, the (2n+1) coded number which the inventor created adds only n pieces of notations expressing n pieces of negative integers(−1 to −n), this notation scheme is quite similar to the conventional one.

The decimal point of a number is taken as reference point, and the left side of the decimal point is called the integer part while the right part is called the decimal part. A left digit next to the decimal point is called the first integer digit, and a next left digit adjacent the first integer digit but one digit removed from the decimal point is called the second integer digit. A right digit next to the decimal point is called the first decimal digit, and a next right digit adjacent the first decimal digit but one digit removed from the decimal point is called the second decimal digit. Using (2n+1) coded number system, a decimal number is transformed into a plural-digit number. The plural-digit number in (2n+1) coded number system is retransformed into decimal number by following steps: Each value or notation (−n to n) at the k-th integer digit is multiplied by $(2n+1)^{k-1}$, and each value at the j-th decimal digit is multiplied by $(2n+1)^{-j}$, and all the calculations are added.

For both integer and decimal parts, if no notations expressing other than zero appear far away from a certain digit, these digits other than the first integer digit can be omitted.

Further, when a decimal number transformed consists only of an integer part, the decimal point and the decimal part are omitted. When a decimal number transformed consists only of a decimal part, the decimal point and the decimal part are written only with zero at the head to clearly indicate the existence of decimal point.

If a decimal part is a repeating decimal that is infinite with a finite block of digits repeating indefinitely, points expressing cyclic section are put on the starting and terminating digit notations (−n to n) of the block, and the following digits are omitted. If the starting and terminating digits are the same or the block is of one digit, the point is put only on the single part.

With the (2n+1) coded number system, when all digits consist of notations or signals expressing zero or are omitted, the value is zero. When any digits include notations or signals expressing other than zero, and when a notation or signal at the highest-order digit (hereinafter referred to a digit expressing positive/negative sign) is one of n pieces of notations/signals expressing positive integers, the number is positive. On the contrary, when a notation or signal at the highest-order digit is one of n pieces of notations/signals expressing negative integers, the number is negative.

As described above, the CPU consists of an integer arithmetic section handling integer data and a fixed-part arithmetic section handling the fixed point part of a floating-point numeral data, and an exponential part of the floating-point numeral data is processed by the integer arithmetic section. Therefore, an integer data and an exponential part of a floating-point numeral data to be processed at the integer arithmetic section both are placed close together at the most right side, having all higher-order digits of zero than the digit expressing positive/negative sign, thus eliminating the need for arithmetic operations. Further, the fixed point part of a floating-point numeral data to be processed at the fixed-part arithmetic section is placed close together at the most left side, having a fixed decimal point, thus resulting in a processing suitable to respective characteristics.

The integer data are placed close together at the most right side, having all higher-order digits of zero than the digit expressing positive/negative sign, which are omitted for memory storage. And, since the fixed point part of a floating-point numeral data is placed close together at the most left side with a fixed decimal point, if the decimal is a repeating decimal, lower-order digits than the terminating digit of repeating block are omitted for memory storage, thus resulting in an effective use of memory area. Further, if the decimal is not a repeating decimal or is a finite decimal, lower-order digits than the lowest-order digit of the significant figure are omitted for memory storage, thus resulting in an effective use of memory area.

BRIEF DESCRIPTION OF THE DRAWINGS

FIG. 1 is a table showing examples of notations or signs used to express numbers according to the (2n+1) coded number system;

FIG. 2 is a table showing examples of notations or notation combinations according to the (2n+1) coded number system;

FIG. 5 is a table showing the relation of input and output in the addition of ternary numbers;

FIG. 6 is a table showing the relation of input and output in the multiplication of ternary numbers;

FIG. 7 is a table showing the relation of input and output in the addition of ennead numbers;

FIG. 8 is a table showing the relation of input and output in the multiplication of ennead numbers;

FIGS. 9(*a*), 9(*b*), 9(*c*), 9(*d*), 9(*e*), 9(*f*), 9(*g*), 9(*h*), 9(*i*), 9(*j*) and 9(*k*) illustrate how to calculate 13! as one example of ternary number multiplication;

FIG. 10 is a table showing the results of factory calculations;

FIGS. 12(*a*) and 12(*b*) are additional illustrations showing the division of ternary numbers;

FIG. 14 is a table showing the results of reciprocal calculations;

FIGS. 16(*a*), 16(*b*), 16(*c*), 16(*d*), 16(*e*), 16(*f*), 16(*g*), 16(*h*), 16(*i*), 16(*j*), 16(*k*), 16(*l*), 16(*m*) and 16(*n*) are illustrations showing an audit calculation of the root of ternary number 2;

FIGS. 17(*a*), 17(*b*), 17(*c*), 17(*d*), 17(*e*) and 17(*f*) are illustrations showing the audit calculation of the root of ternary number 2;

FIGS. 18(*a*), 18(*b*), 18(*c*), 18(*d*) and 18(*e*) are illustrations showing the audit calculation of the root of ternary number 2;

DETAILED DESCRIPTION OF THE INVENTION

Figure 3:
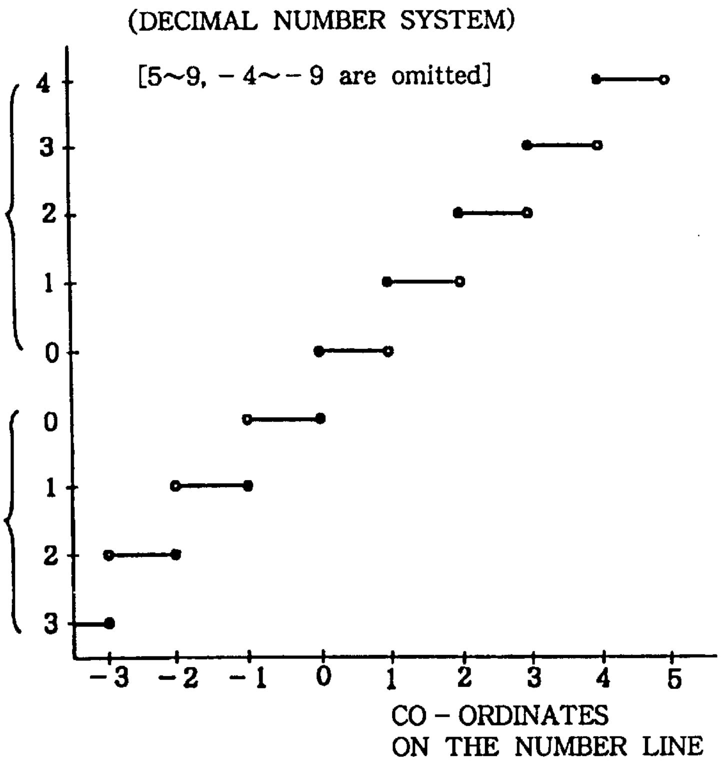
FIGS. 3(*a*) and (*b*) are graphs showing the ranges which notations for use in the decimal and binary number systems mean.
Figure 3:
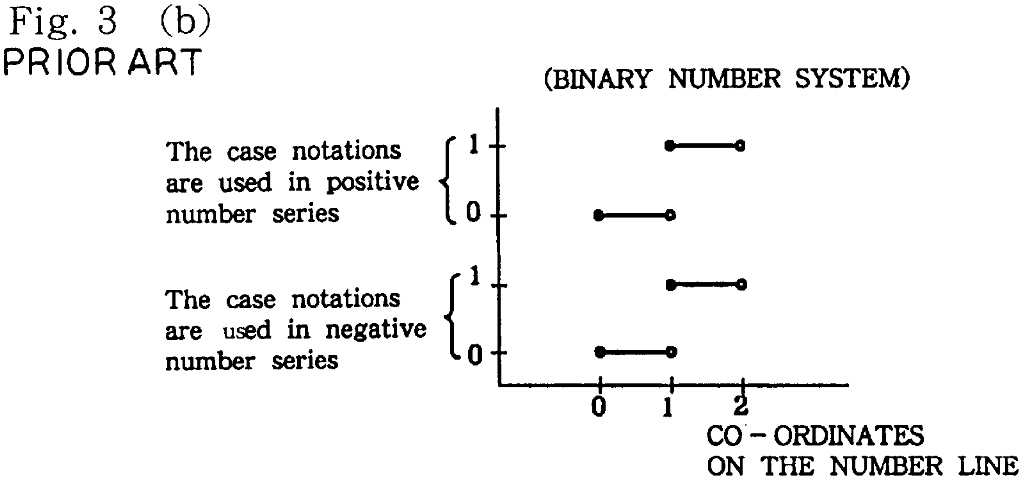

Now detailed description will be made for the (2n+1) coded numbers and their system the inventor devised and preferable embodiments of the CPU and the electronic computer according to the present invention will be described, referring to the accompanying drawings.

The (2n+1) coded number system refers to a number notation system and its computing method of numbers of one or more digits in which a number of a single digit is represented with one signal or notation selected from (2n+1) pieces of signals that represent a set of digits $\{X_1, X_2 \ldots X_{2n+1}\}$ consisting of n pieces (1 to n) of signals expressing positive integers; n pieces (−1 to −n) of signals expressing negative integers; and one signal expressing zero, where n is one or larger integers. Here, a number expressed by the (2n+1) coded number system is referred to a (2n+1) coded number. As compared to the conventional decimal number system in which 10 pieces of notations (0, 1, . . . , 9) consisting of 9 pieces of notations (1, 2, . . . , 9) expressing 9 pieces of (1 to 9) positive integers (n=9) and one notation (0) expressing zero are used, this system is a quite similar system, only except for having additional n pieces of notations expressing negative integers. When coding a certain number of plural digits, the coded notations are obtained by multiplying each figure (−n to n) by $(2n+1)^{k-1}$ for the k-th digit of integer and by $(2n+1)^{-j}$ for the j-th digit of decimal number, and then obtaining their summation for all coded digits. According to the (2n+1) coded number system, the value of a number in which all coded digits consists of zero notations or are omitted is zero. If any digits include notations other than zero, and when the most left-handed notation, the most significant digit, (that of a digit expressing positive/negative sign) is one of the n pieces of notations expressing positive, the number is positive. On the other hand, when the most left-handed notation, the most significant digit, is one of the n pieces of notations expressing negative, the number is negative.

As examples of the (2n+1) coded number system, the following describes a case 1 for ternary number system in which n equals 1, a case 2 for ennead number system in which n equals 4, and a case 3 for 27 coded number system in which n equals 13. “n” is not limited to the above, but any integer, if positive, may be selected. In other words, (2n+1) may be any positive odd number larger than 3, thus having infinite combinations.

FIG. 1 shows notations in use for the cases 1, 2 and 3. Notations for one digit may not necessarily be one letter. For example, according to the conventional sexagesimal number system in use for time and angle minutes/seconds, zero is coded as 00, 1 as 01, 2 as 02, and 59 as 59. Like these, combinations of two figures are used for one digit of notations too. For example, in a 9 scale number system (n=4), zero notation may be±0, positive integer notations for 1 to 4 may be respectively +1, +2, . . . , +4, and negative integer notations for −1 to 4 may be respectively −1, −2, . . . , −4. These combinations of two letters may be notations expressing one digit of numbers.

As shown in FIG. 1, these three cases apply one letter for all one digit numbers. In other words, the case 1 of ternary number system (a) uses a notation or letter Y for +1, W for −1 and x for zero. The case 2 of ennead number system (b) uses the same notations 0 to 4 as that of the decimal system for zero and positive integers 1 to 4, and notations (① to ④) which are made by encircling numbers expressing positive integers which are equal to the absolute values for negative numbers (−1 to −4). The case 3 of 27 scale number system uses (for zero notation, alphanumeric A to M for notations expressing positive integers 1 to 13, and alphanumeric Z to N for notations expressing negative integers −1 to −13.

FIG. 2 is a table showing notations used in the cases 1, 2 and 3 as well as binary numbers using the complement of 2 for expressing decimal numbers −20 to 20. (a) shows ternary numbers or notations in the case 1, (b) ennead numbers in the case 2 and (c) the 27 scale notations in the case 3. In any cases notations showing the left side zero are omitted. All numbers listed in the table are integers, and decimal points are neglected, which can be regarded as to exist next close to the most right handed digit. The two continuous notations of ternary number system (a) in the case 1 are grouped into one from the right end, and when each one group is substituted by the notations for the ennead number system in the case 2, they are transformed into the numbers (b) in the ennead number notations. Similarly, the three continuous notations of ternary number system (a) in the case 1 are grouped into one from the right end in reference to decimal point place, and when each one group is substituted by the notations for the 27 scale number system in the case 3, they are transformed into the numbers (c) in the 27 scale notations.

On the contrary, transformation from the numbers (b) expressed by the ennead scale notation system in the case 2 into the numbers (a) expressed by the ternary notation system in the case 1 can be made by substituting each letter in each digit in the ennead system with the relevant two digits in the ternary system. Similarly, transformation from the numbers (c) expressed by the 27 scale notation system in the case 3 into the numbers (a) expressed by the ternary notation system in the case 1 can be made by substituting each letter in each digit in the 27 scale system with the relevant three digits in the ternary system.

Expression of a negative number by the decimal notation system can be obtained by putting (−) sign on the left side of the positive integer having the same absolute value to indicate it is negative. As compared to the above, expression of a negative number by the (2n+1) scale notation system is obtained by substituting all notations other than those expressing zero with the other one of paired notations with same absolute value but different sign. More specifically, in the ternary system (a) in the case 1, Y and W are interchanged with each other. In the ennead system (b) in the case 2, 1 and ①, 2 and ②, 3 and ③, as well as 4 and ④ are respectively interchanged with each other. In the 27 scale system (c) in the case 3, A and Z, B and Y, . . . , M and N are respectively interchanged with each other. Thus, as seen in FIG. 2 the most significant digit in each number indicates both its magnitude and positive negative state. The least significant digits of each number is the subject (2n+1) coded number system have a radix of (2n+1).

FIG. 2 shows binary system numbers (d) too expressed by two's complement. A number with all digits of 0 is 0. When at least any one digit is 1, a number with the most left-handed digit of 0 is positive, while a number with the most left-handed digit of 1 is negative. Negative numbers have at least one piece of 1 at their head or left side, any zero notations at the left side cannot be neglected in the same way as is made in the decimal numbers or the (2n+1) scale numbers during making arithmetic operations, thereby taking longer time. FIG. 2 (d) shows binary numbers of 8 digits. When larger numbers with larger digits are to be handled, this system would have the larger demerit that cannot neglect the left-handed digits.

Such being the case, there may appear to be an insignificant difference between the two binary and (2n+1) scale notation systems, but there is a large difference.

For example, any notations themselves such as 54 . 27 in use for the decimal number system express their numeric values. The place (digit) where they are put in will decide the power of ten to be multiplied. In this connection, a value expressed by a notation indicates not only the value itself but also a range which notations following in the right side may express. In this example, 5 may include a potential numerical range equal to or larger than 5 and less than 6, and 4 may be equal to or larger than 4 and less than 5. FIG. 3 shows these potential numerical ranges.

According to the notations by the decimal number system in FIG. 3 (a), since negative numbers are attached on their absolute values with negative sign, a range which notations following in the right side may express is varied depending on whether they are positive or negative numbers, or spread symmetrically centering on 0. When a notation such as 2 is used in negative series, the 2 means a range larger than −3 and equal to or less than −2. In this connection, when zero is used in negative number series, the solid circle at the right side of a range may express e.g., −50. 0.

The binary number system shown in FIG. 3 (*b*) may often use 2's complement to escape from the trouble that a range which notations following in its right side may express is varied depending upon whether the number is positive or negative like the decimal number system. For this reason, as shown in FIG. 3 (*b*), e.g., notations following in the right side of 0 and 1 to be used in both positive and negative number series indicate the same ranges. However, considering the overall values which may be expressed by finite digits, the both ends of the range may be different. For example, the integers which can be expressed using the binary 8 digit number system ranges from −128 to 127, and if 16 digits, from −32768 to 32767.

According to the technique in the prior art, a notation ranges or spreads only in a direction, starting from its numerical value, like 4 which ranges over 4. This limitation is not limited only to the decimal system but to the binary system and the sexagecimal system similarly.

Figure 4:
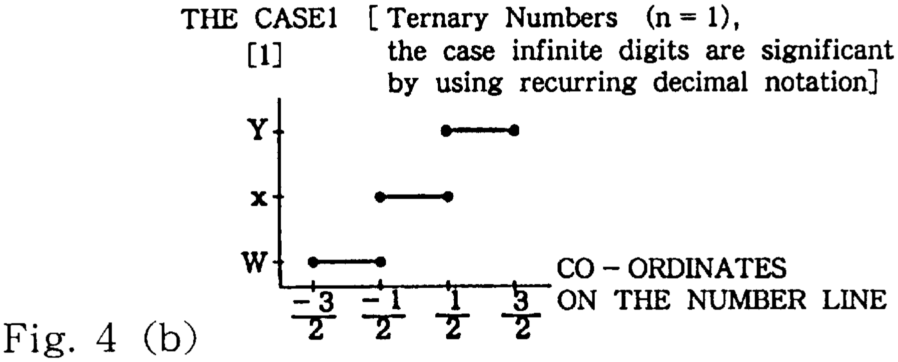
FIGS. 4(*a*), 4(*b*) and (*c*) are graphs showing the ranges which notations for use in the (2n+1) coded number system mean.
Figure 4:
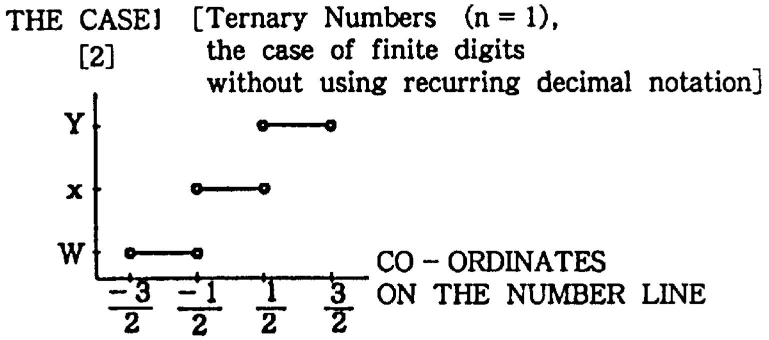
Figure 4:
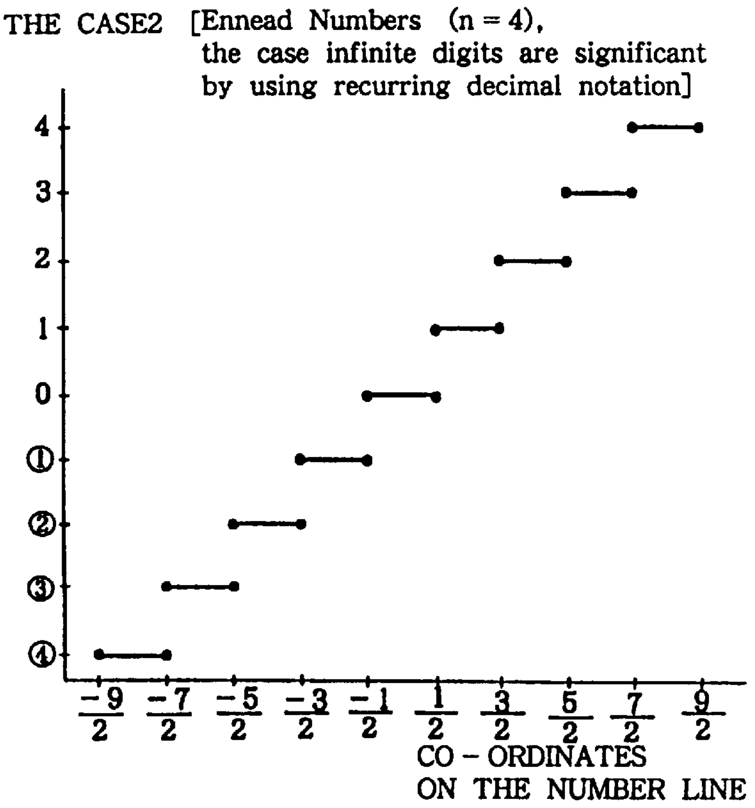

On the contrary, according to the (2n+1) coded number system this inventor created, as shown in FIG. 4, the range spreads in both sides centering on the value the notation has, because this system can handle positive and negative numbers quite in the same way. As a result, with the ternary system (a) in the case 1, Y includes ½ in both sides centering on 1 as its range, x includes ½ in both sides centering on 0, and W includes ½ in both sides centering on −1. The both ends of the range are solid circles when infinite digits can be expressed by using recurring decimal notation, while blank circles when finite digits are expressed using no recurring decimal. When both ends are solid circles, $$x.\dot{Y} \text{ and } Y.\dot{W}$$

both express the same ½. Without using recurring decimal, a number expressed by finite digits is discontinuous on the number line, thus having numbers which can be expressed and cannot be expressed. Those numbers only happen to superpose on a multiple of ½, thus permitting the boundary multiple of ½ to be expressed only by approximation. Similarly, FIG. 4 (*c*) shows the ennead system in the case 2 with recurring decimal expression. A range which a notation and notations following thereafter can express spreads by ½ on its both sides centering on the value which it has. This is based on that the maximum value of decimal is ½ and the minimum value is −½, which can be said in the same way for all (2n+1) scale systems. Now, this is described as follows:

First a notation expressing zero is denoted as φ, a notation expressing n is denoted as α, a notation expressing −n is denoted as β, and a notation expressing 1 is denoted as γ.

Using the (2n+1) system, the maximum value of a decimal is $$\phi.\dot{\alpha},$$

while the minimum value is $$\phi.\dot{\beta}.$$

$$\begin{aligned}\phi.\dot{\alpha} &= \phi.\alpha\alpha\alpha\alpha\alpha\alpha\alpha\alpha\alpha\ldots\\ &= \frac{n}{2n+1} + \frac{n}{(2n+1)^2} + \frac{n}{(2n+1)^3} + \ldots\\ &= \frac{n}{2n+1}\left\{1 + \frac{1}{2n+1} + \left(\frac{1}{2n+1}\right)^2 + \ldots\right\}\end{aligned}$$

The above is transformed into the following by the formula of the sum of infinite geometrical progression:

$$\begin{aligned}&= \frac{n}{2n+1} \times \frac{1}{1 - \frac{1}{2n+1}}\\ &= \frac{n}{2n+1} \times \frac{2n+1}{(2n+1)-1}\\ &= \frac{n}{2n+1} \times \frac{2n+1}{2n}\\ &= \frac{1}{2}\end{aligned}$$

Similarly, $$\begin{aligned}\phi.\dot{\beta} &= \phi.\beta\beta\beta\beta\beta\beta\beta\beta\beta\ldots\\ &= \frac{-n}{2n+1} + \frac{-n}{(2n+1)^2} + \frac{-n}{(2n+1)^3} + \ldots\\ &= \frac{-1}{2}\end{aligned}$$

Here, for its convenience, reference is put on decimal point for computing, and this applies to all digits, and for all values of n. Therefore, when smaller digit fractional part in a notation series expressing a number in the (2n+1) system is truncated for rounding, the absolute value of the cutoff value from the original is smaller than ½ of a value in the remaining smallest digit. Using recurring decimal, in the boundary following formula holds:

$\phi.\dot{\alpha}=\gamma.\dot{\beta}$

When the part of decimal point and following is rounded for approximation, selection of φ or γ is ambiguous. In such a case, calculation may be performed with recurring decimal, and when printing or outputting the results, if such recurring decimal is included, it may be rounded off to the purpose. This method can reduce possible cummulative error as compared to the one where every operational result is rounded off for approximation.

Now, four arithmetic operations in the (2n+1) scale system will be described as follows:

The longhand method is similar to the one in the conventional decimal number system. Here, It should be noted that values expressed by individual notations may be positive or negative, or inclusive of both.

Addition (Augend)+(addend)=total

The two numbers can be interchanged according to the cummutative law. Places of decimal points are aligned to each other, and addition is made for every digit from the lower-order digit (right side), to obtain the digit value and carry, while shifting to higher-order digit (left side). FIG. 5 shows the relation between input and output in the operation for every digit in the addition according to the ternary system in the case 1. In this table, one of augend and addend is taken as input A (21) while the other is taken as input B (22). Since in the smallest digit (rightmost) there is no carry, look at the column (24) of x expressing zero for carry (23). When both of input A (21) and input B (22) are notation x, the output is notation x (25).

When input A (21) and input B (22) respectively are notations x and W, the output is notation W (26). When both of input A (21) and input B (22) are notation Y, the output is two-digit notation YW (27). The right side digit of output expresses the sum of the digit, while the left side digit expresses carry output. When the carry output is zero, the output is omitted, so that a column of only one digit output can be read as the carry output is notation x. Then, go to a next left-side digit for operation. Since there may be digit carry from the lower-order digit (right side), specify an output column by a combination of carry (23), input A (21) and input B (22) to obtain the sum of the digit and carry output. This operation is succes-sively shifted to higher-order digit (left side), and the operation is terminated when no notations other than that of zero appear to the left side of the digit, and when carry output becomes notation x expressing zero.

FIG. 7 shows the relation of input and output in addition according to the ennead scale system in the case 2: FIG. 7 is different in arrangement from FIG. 5 for drawing paper's convenience, but the same consideration can be taken. As shown in FIGS. 5 and 7, to express one digit number, the (2n+1) scale system uses one notation selected from the (2n+1) pieces of notations consisting of n positive notations, n negative notations and one zero notation, so that in one digit addition positive and negative often cancel out each other, thus having a less carry frequency as compared to the conventional decimal and binary number systems.

Subtraction

Operation of (Minuend)−(subtracter)=difference is performed by inverting the sign (+ or −) of the subtracter to make addition of them according to the above described method.

Multiplication

Operation of (Multiplicand)×(multiplier)=product may be performed by interchanging them according to the cummutative law. FIG. 6 shows the relation of input and output in multiplication for every digit of ternary numbers in the case 1. FIG. 8 shows the relation of input and output in multiplication for every digit of ternary numbers in the case 1. As shown in FIG. 8, in the multiplication of ennead numbers in the case 2, there are carries, not only 1, ① but also 2, ②. On the contrary, in the multiplication of ternary numbers in the case 1, as shown in FIG. 6, there is no carry, resulting in an easy operation. It is natural because notations in use for one digit in the ternary system are nota-tion Y representing positive integer 1, notation W representing negative integer 1, or notation x representing zero.

FIG. 9 is examples showing how to make a long-hand operation of multiplication of the ternary numbers in the case 1. Taking out one digit of multiplier, write the result of multiplying the multiplicand with a value expressed by the digit and positional notation together, and obtain the summation. This writing is similar to the one for use in the decimal longhand operation in the prior art, notation representing positional zero may be often omitted in the operational course. When one digit of multiplier number is taken out, if it is zero notation, the product is also zero, thus permitting the writing to be omitted, like the case of decimal numbers. When one digit of multiplier number taken out is notation Y (representing +1), the multiplicand is written as it is, while when one digit taken out is notation W (representing −1), the sign (+ or −) of the multiplicand is inverted and digit position is aligned for writing.

A specific example of multiplication is described using FIG. 9 (*f*). Here, the multiplicand is YWYxWYWxx (31), and multiplier is YxW (32). The two digits xx at the right end of the multiplicand may be omitted as notation expressing positional zero in the operational course. The multiplication of the multiplicand by the notation W of the integer first digit of the multiplier (32) is written as WYWxYWY or intermediate value (33) which is obtained by inverting the sign of the multi-plicand. Since the integer second digit of the multiplier (32) is zero notation, the writing of the intermediate value which is obtained by multiplying it by the multiplicand is omitted. Since the integer third digit of the multiplier (32) is notation Y, an intermediate value (34) YWYxWYW is written as it is, which is obtained by removing positional zero notation from the multiplicand. Add the intermediate values (33) and (34), and additionally put notations xx expressing positional zeros to the end, then the product (35) is obtained by longhand.

When a multiplier has three or more (e.g., n) pieces of notations other than zero notation, n pieces of intermediate values are obtained, and added to obtain the product. For example, like intermediate values (36) WxY, (37) WxY and (38) YxW in FIG. 9 (*c*), they all may be written to add them, or as using the abacus first the intermediate values (36) and (37) may be added, and then the intermediate value (38) may be added separately.

As a whole, FIG. 9 is an example showing how to calculate the factorial of 13. This calculation can be summarized into FIG. 10 or table. Notations (a) in the ternary system in case 1, notations (b) in the ennead system in case 2, and notations (c) in the 27 scale system in case 3 are arranged to compare them with the notations (e) in the decimal system. In this case, all notations have positive value. With the (2n+1) scale system, notations expressing positive/negative sign is always one of notations expressing positive.

Division

The operation of (Dividend)/(divider)=quotient is somewhat different from the one to be made in the conventional decimal system. From the relation of dividend and divider, the process obtaining one digit by one digit of quotient may be the same, but is different in that the meaning of one digit notation obtained is various as shown in FIGS. 3 and 4. With the conventional decimal system, a value to be obtained as one digit of quotient is a maximum one which does not produce a negative residue, and the values are searched successively from the top-order (left side) digit to obtain quotient. On the contrary, with the (2n+1) scale system, residue may be positive or negative. A range of value expressed by each notation is bounded by ½'s multiple.

Figure 11:
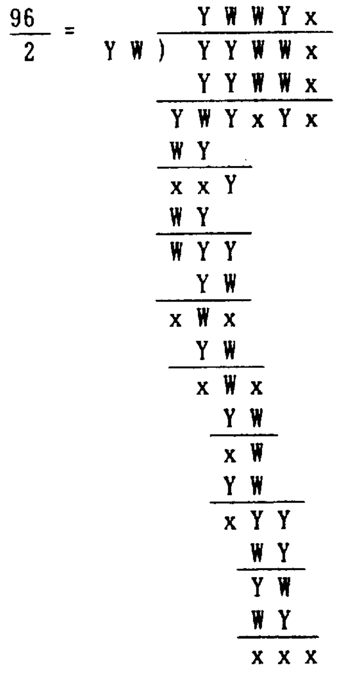
FIGS. 11(*a*), 11(*b*), 11(*c*), 11(*d*) and 11(*e*) are illustrations showing the division of ternary numbers.
Figure 11:
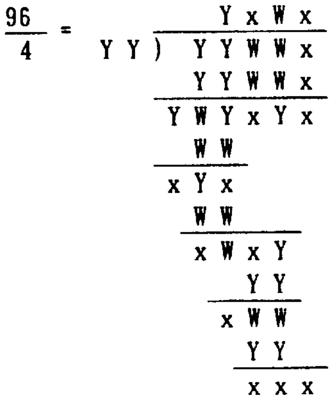
Figure 11:
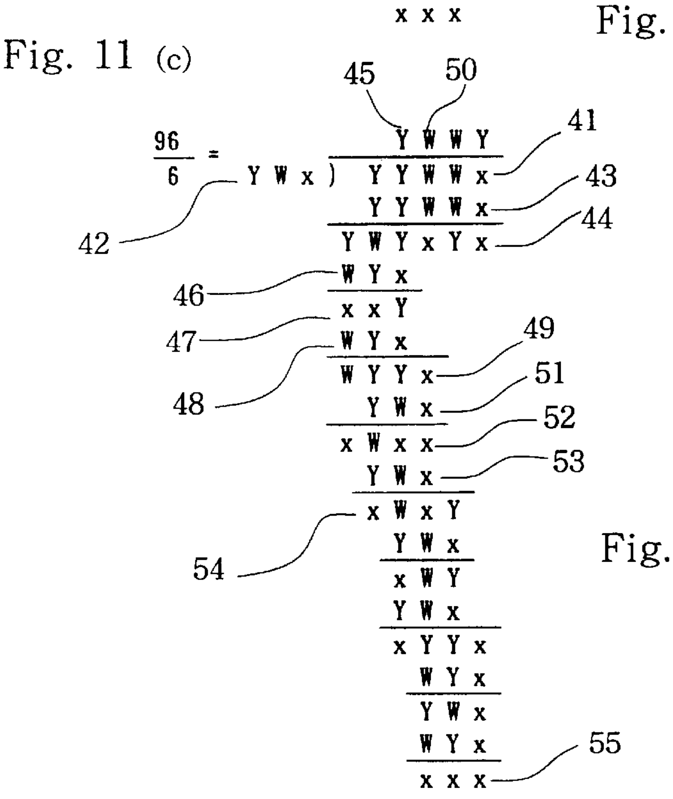
Figure 11:
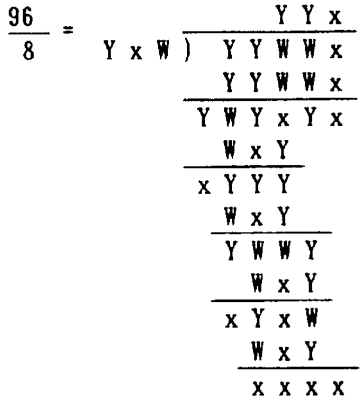
Figure 11:
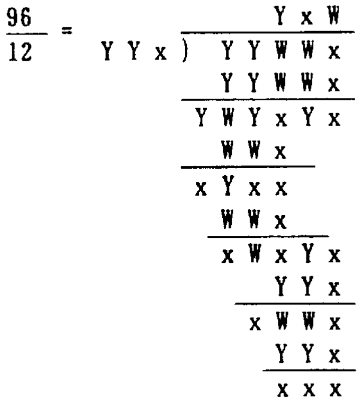
Figure 13C:
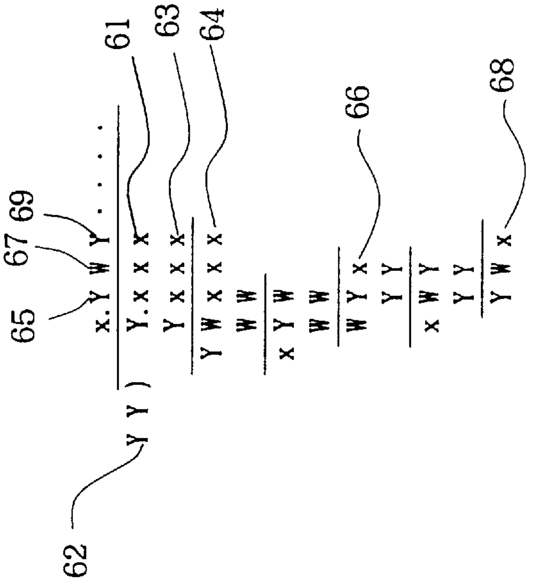
FIGS. 13(*a*), 13(*b*), 13(*c*), 13(*d*), 13(*e*), 13(*f*) and 13(*g*) are illustrations showing how to calculate reciprocals of ternary numbers.
Figure 13B:
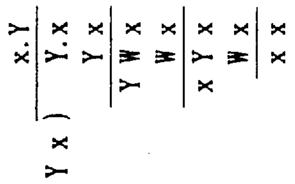
Figure 13A:
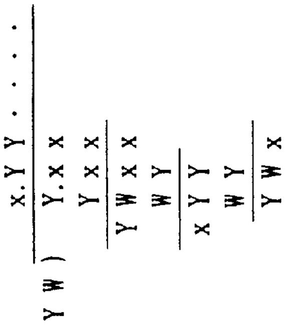
Figure 13D:
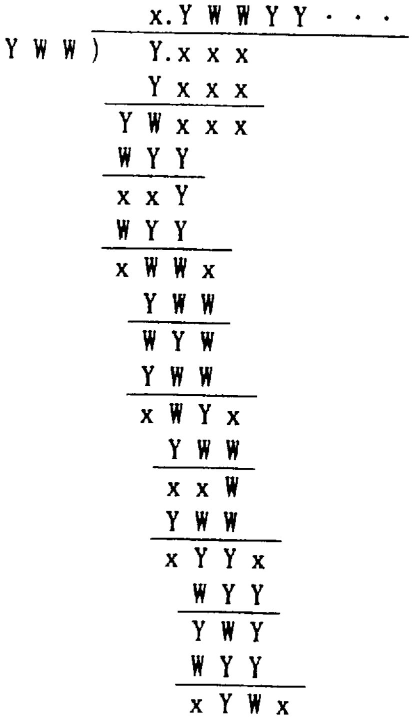
Figure 13E:
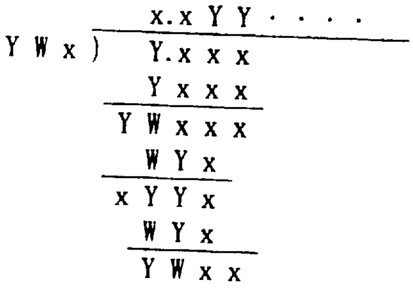

FIGS. 11 and 12 show examples of longhand operations of division according to the ternary system in the case 1, as specific examples of division according to the (2n+1) scale system. An example shown in FIG. 11 (*c*) is used to describe how to make division of 96/6 according to the ternary system. The dividend is expressed by YYWWx (41) and The divider by Ywx (42). Paying attention to the fact that a range expressed by each notation is a multiple of ½, the dividend is doubled beforehand to easily search the multiple. Add the dividend (41) and a same value (43) as the divident to obtain the first residue (44). Now one digit by one digit of quotient is being obtained. The one digit may be positive or negative as described previously. When the signs of notations of residue (44) and divider (42) are same, one digit of quotient is notation Y expressing positive 1, while if different, one digit of quotient is notation W expressing negative −1. When a product of one digit notation Y (45) obtained in such a way and divider (42) is subtracted from the residue (44), write the difference (47) at the leftmost digit so as to have its sign same as that of residue. In this longhand operation, instead of making subtraction, signs are inverted to make addition. By inverting sign of a product of one digit notation Y (45) of qutient and divider (42), write it as WYx (46), to obtain the sum (47) of the WYx (46) and residue (44). In this case, the sum (47) is xxYxYx exactly, but unneces-sary digits are omitted, thus writing only as xxY by neglecting the lower-order digits. Here, confirm that the signs of the sum (47) and the residue (44) are same. Since the dividend is doubled at the beginning, add the sum xxY again with the WYx (48) to obtain the second residue WYYx (49). For the residue (49), perform the same operation as performed for the previous residue (44). The second residue WYYx (49) is negative different from the sign of divider (42), so that the one digit of the quotient becomes notation W (50) expressing −1. Invert the sign of the notation (50) and the divider (42). In other words, write the divider YWx (51) to obtain the sum (52) of the (51) and the second residue (49). Here check for same signs of the sum (52) and the second residue (49). Again add the divider YWx (53) to obtain the third residue (54). Repeat this operation until all digits of residue (55) show notation xxx indicating zero, which shows that the divident is divided by the divider without a remainder, so that notation x expressing positional zero is added as required to bring the operation to the end.

If a division operation is indivisible, multiply the last residue by ½ to obtain the residue of the operation, because at the beginning dividend is doubled.

When the divident is positive integer 1, obtained quotient is called the reciprocal or inverse of the divider. FIG. 13 shows the reciprocal operation of positive integers 2 to 8 as examples in the ternary number system in the case 1. When a divider is a 3' power, any dividend is divisible as shown in FIG. 13 (*b*), and the reciprocal is also a 3' power, and all reciprocals of other integers are recurring decimal.

Description will be made for how to make a longhand reciprocal operation using FIG. 13 (*c*):

In this case, the dividend is Y.xxx (61), while the divider is YY (62). The divider (62) is an integer, thus omitting decimal point, but may be written as YY. In the computing course, computing is made neglecting decimal point to obtain quotient. The series of notations of the quotient is added at the end with notations x indicating positional zero as required and decimal point is added. Similarly to the division examples in FIG. 11, The same value (63) as that of the dividend (61) is added to the dividend to obtain the first residue (64). Since the signs of the residue (64) and the divider (62) are same, one digit of the quotient is notation Y (65) expressing positive 1. Search for the digit position to obtain the second residue (66). Similarly obtain another digit W (67) of the quotient and the third residue (68). The third residue (68) is the same as that obtained by shifting the first residue (64) two digits to the right, while the next digit Y (69) of the quotient is also obtained by shifting the one digit Y (65) of the quotient two digits to the right. In such a way, when the same residue as the first residue with digit shifted is obtained, successive operations are continued. Then, each digit of the quotient is the same as that digit-shifted by the same number of digits, resulting in repetition with a cycle having the same number of digits. In this case, the quotient has a cycle of two digits, repeating a combination of recurring section YW. In other words, the starting point of the recurring decimal is Y (65), the terminating point is W (67), the cycle is two digits or the number of digits of the recurring section is two. The recurring section is added with decimal point and notation x expressing integer first digit of zero at their head, and points indicating it is a recurring decimal are put on the top of the starting notation Y (65) and the terminating notation W (67) to obtain a following quotient:

$$x.\dot{Y}\dot{W}$$

FIG. 14 shows reciprocals of integers 2 to 27 obtained as described above. As compared with the decimal numbers (e) shown in FIG. 14, the ternary notations (a) in the case 1 have more frequent recurring decimals. For recurring decimals, a series of notations of recurring section having finite numbers of digits are stored in the memory to make computation, which has the same accuracy as that obtained using infinite number of digits. In this connection, the three notations for which "the number of digits of recurring section in the ternary notation system" (f) is shown zero indicate that they are divisible in the reciprocal calculations.

In the case when dividend is not 1 or when making normal division other than reciprocal calculation, it is difficult to decide whether a residue is the same as that which appeared before. Therefore, in the normal division, first obtain the reciprocal of a divider, and multiply the reciprocal by the dividend. This method can make effective use of recurring decimal, to perform division calculation by finite number of digits with the same accuracy as that which can be obtained by infinite number of digits.

In scientific and technological calculations, data with floating point are widely used. A number is divided into a fixed point part including decimal point and an exponent part consisting only of an integer. Those parts are stored in the memory for use in computation. In the (2n+1) scale system too, this data with floating point can be used. To this end, decimal point is so located that the product of the power of (2n+1) expressing the integer value of the exponent part and the fixed point part are equal to the original value. Therefore, as the decimal point position is shifted by 1, it is necessary only that the integer of the exponent part be added or subtracted by 1, allowing for several combinations. However, normally in order to make the most of the merits of floating-point representation, the fixed point part is comprised only of significant figures, and decimal point is fixed to a definite position, so that the need for specifying decimal point positions for every calculation can be eliminated, thus facilitating operation processing a great deal.

Here, with the fixed-point part of the floating-point representation data according to the (2n+1) scale system, only a single digit of notations expressing positive/negative signs is regarded as the integer part, while all smaller digits are included into the decimal part (this is referred to normalization of floating-point representation data). As a result, when the maximum digit of the fixed-point part or the digit of the integer part of the fixed-point part is a notation indicating zero, the number is zero. When a notation of the digit of the integer part is one of notations indicating n pieces of positive integers 1 to n, the number is positive, and the fixed-point part ranges from ½ to (n+½). When a notation of the digit of the integer part is one of notations indicating n pieces of negative integers −1 to −n, the number is negative, and the fixed-point part ranges from −½ to −(n+½). Concerning to the fixed-point part of this floating-point representation data, the digit positions of starting and terminating points of a recurring decimal are handled together with the series of notations of fixed-point part, thereby compressing the number of digits to be stored and further resulting in the calculation with less number of digits which can have the same accuracy as that obtained using infinite number of digits.

Figure 15:
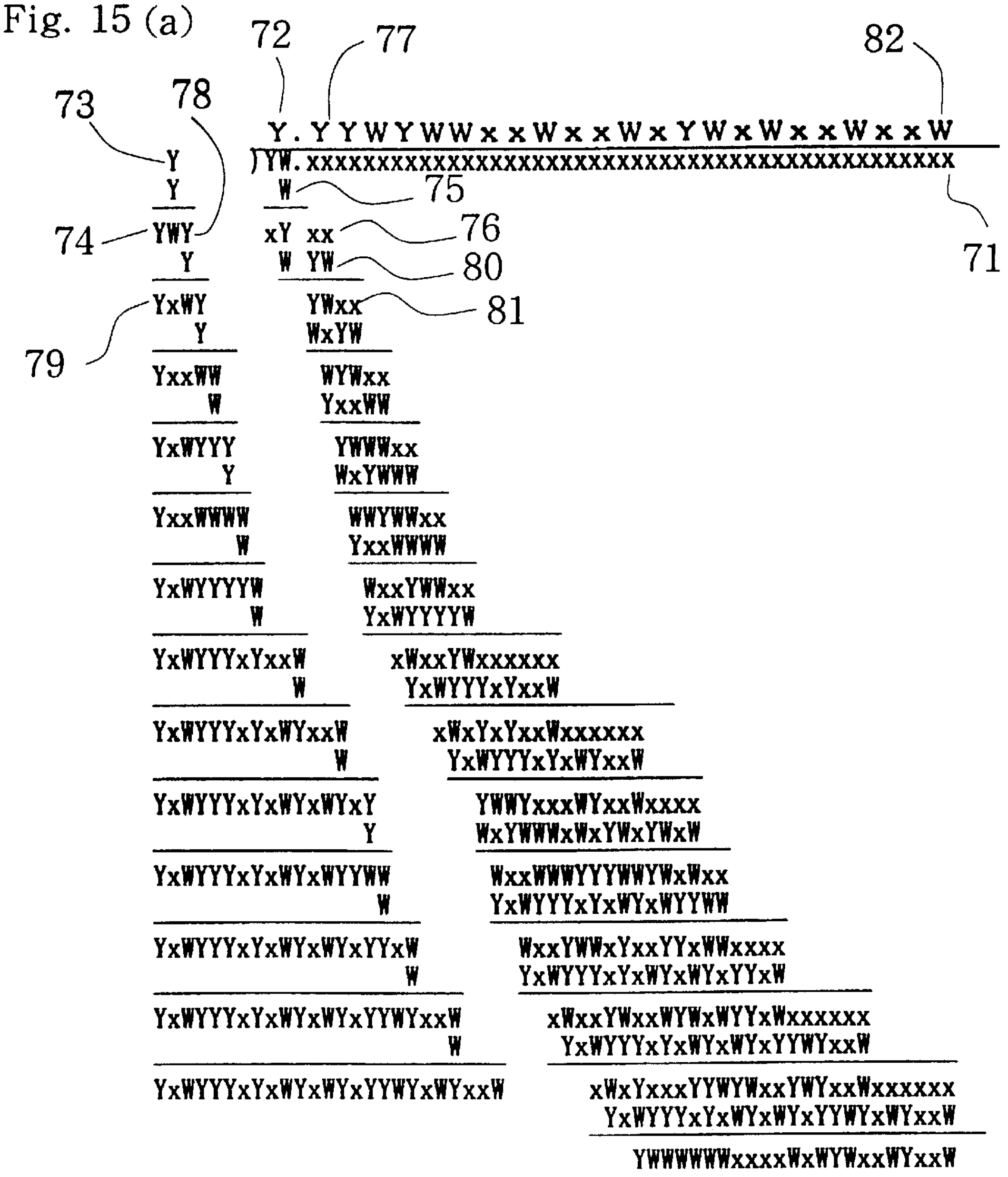
FIGS. 15(*a*) and 15(*b*) are illustrations showing the calculation of the root of ternary number 2 and its audit calculation.
Figure 15:
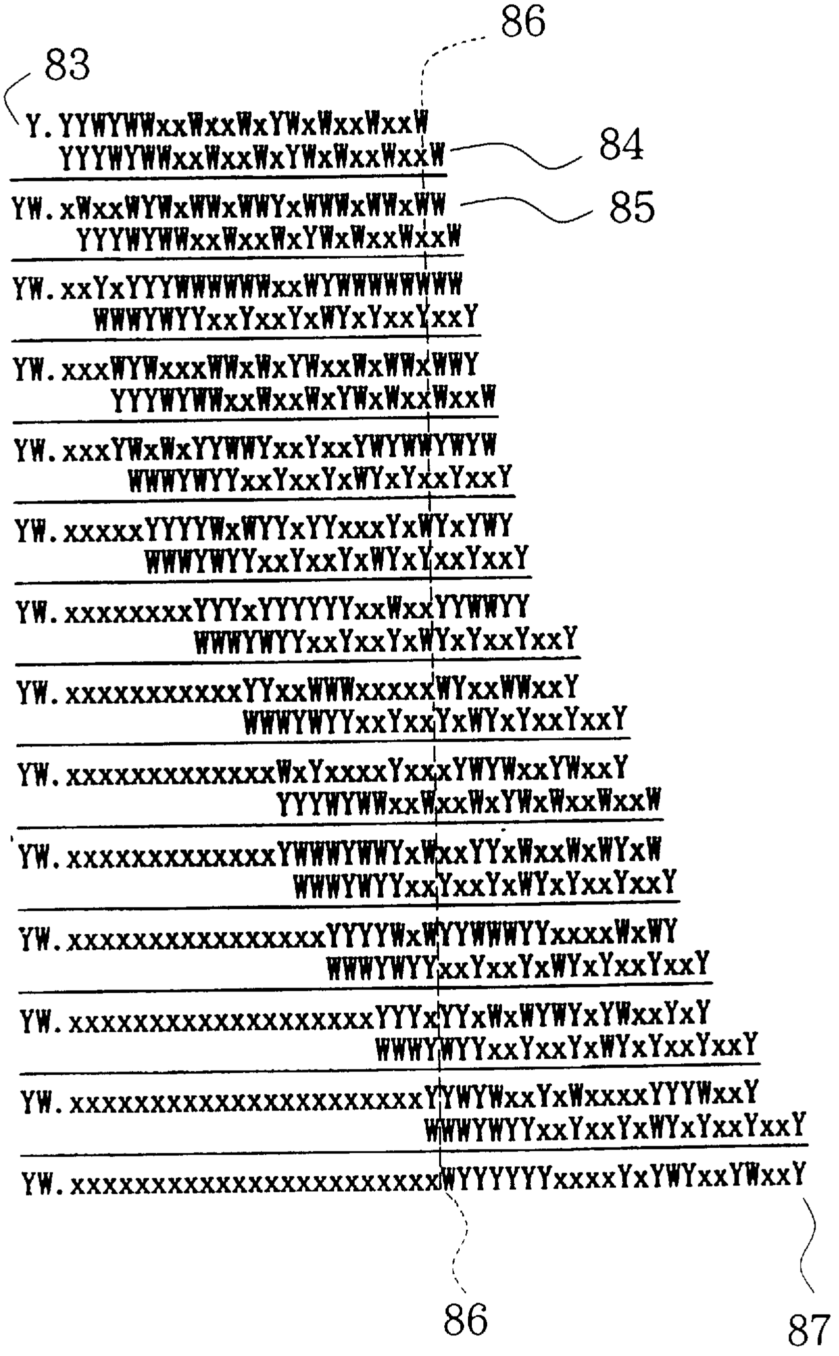

Now, a longhand operation to obtain the square root of ternary numbers in the case 1 according to the (2n+1) scale system will be described as follows:

FIG. 15 (*a*) shows how to calculate root 2, which is similar to the case of the decimal system, so that theoretical explanation may be omitted and only its process is shown here. First write an original value (71) for obtaining its square root. Group the notations two digits by two digits in reference to the decimal point, and obtain the square root one digit of the two digits of original value (71). Write Y (72) as an approximate value of the square root of integer part YW of the original value (71), and write two pieces of the same value Ys (73) in two tiers at the left outside, and make their summation to obtain a value YW (74) equal to twice the approximate value. On the other hand, instead of subtracting the square of the approximate value from the original value YW (71), a value W (75) obtained by inverting the positive/negative sign of square of approximate value Y (72) is added to the original value YW (71), to obtain the first approximate residue Y (76). Obtain the next digit Y (77) of the approximate value, write a value Y (78) equal to the first digit of this approximate value after a value YW (74) of twice the approximate value, and add the first digit Y of this time approximate value to it to obtain twice YxW (79) the second approximate value. On the other hand, add the first approximate residue to a value WYW (80) which is obtained by multiplying a value YWY obtained by putting Y (78) after YW (74) by the first digit Y (77) of this time approximate value and by inverting the sign of the value obtained, to obtain the second approximate residue YW (81). In this connection, the first digit of the approximate value to be obtained is notation Y representing positive integer 1 when the signs of approximate residues (76) (81) and twice (74) (79) the approximate value are same, while the first digit is notation W representing negative integer −1 when the signs are different. Using the above described method, continue to obtain successive approximate values while successively shifting digits so that the digit position of notation indicating the sign of a next approximate residue comes to the right side digit of the digit position of notation indicating the sign of a preceding approximate residue, until the approximate value (82) of the square root of the original value (71) is obtained.

As described above, the (2n+1) scale system handles positive number and negative number on a footing of equality. An original number (71) from which square root is obtained must be positive, but the square root obtained should have both of positive and negative signs. Therefore, when the approximate value (72) of the integer part shown in FIG. 15 (*a*) is assumed to be W, another value W. WWYWYYxx . . . is obtained by inverting the sign of the square root obtained in FIG. 15 (a) similarly.

FIG. 15 (*b*) shows how to check the square root obtained in FIG. 15 (*a*). Here is shown a longhand method which is to be used in a procedure making addition with abacus. First, multiply an approximate value (82) of a square root by its first digit (72), to obtain the first check value (83). Next, add the first check value (83) to a value (84) which is obtained by multiplying the approximate value (82) by the second digit (77), to obtain the second check value (85). Continue this operation while successively shifting to the right digit, and you can see how the check value approaches the original value (71). In this connection, a vertical line (86) in FIG. 15 (*b*) shows the range of significant figure digit of the square root approximate value (82) used in this check calculation. The lowest stage shows that the check values are obtained correctly down to this range.

Now, FIGS. 16, 17 and 18 show how check values change when checking the approximate value (82) of square root 2 obtained in FIG. 15 (*a*). Similarly to FIG. 15 (*b*), this check is made to the procedure of addition with abacus, four digits of abacus in FIG. 16 (*a*) and five digits of abacus in FIG. 16 (*b*). These drawings show that the four digits of abacus can have Y.YY as the approximate value. Conversion of Y.YY expressed by the ternary notations into the decimal number obtains the following:

$$13/9=1.\dot{4}=1.444\ldots$$

Further, the five digits of abacus can have Y.YYW as the approximate value. Conversion of Y.YYW into the decimal number obtains the following:

$$38/27=1.\dot{4}0\dot{7}=1.407407407\ldots$$

These results show how high the computing accuracy of the (2n+1) system is as compared to that of the decimal system. The case of 25 digits as shown in FIG. 18 (*b*) is an example where all digits of the approximate value (82) of square root 2. You can see that the case of less number of digits results in computing by cutting off the right side digits of the approximate value (82). In this case, error to be included in the check value is smaller than the last 2 digits in the worst case. On the contrary, FIGS. 18 (*c*), (*d*) and (*e*) show the cases where the number of digits of abacus is larger than the approximate value (82) of square root 2, from which you may understand that calculation of values with small number of digits (A) using a large number of digits of abacus would result in all parts obtained over the number of digits (A) being erroneous. This suggests how significant or worthwhile it is to be able to express down to infinite digits using recurring decimal, if possible.

When generally obtaining a square root, first, two digits by two digits is shifted to bring the decimal point to a place for easy calculation, and then the decimal point position is corrected to obtain a correct square root. This method can be applied to the (2n+1) scale system. According to the ternary system in the case 1, it my be sometimes difficult to determine the desirable position of the first digit or Y (72) in the example in FIG. 15 (*a*). This determination may be made as follows:

When the integer part is one digit Y, the maximum value is $$Y.\dot{Y}$$

The square of the above is $$YW.\dot{Y}\dot{W}$$

The above respectively can be converted into the next decimal numbers, 1. 5 and 2. 25 equal to 1. 5×1.5.

Further, when the integer part is one digit Y, the minimum value is:

$$Y.\dot{W}$$

The square of the above is $$x.\dot{Y}\dot{W}$$

The above respectively can be converted into the next decimal numbers, 0. 5 and 0. 25 equal to 0. 5 ×0.5. Therefore, when an original value from which the square root is to be obtained ranges from $$x.\dot{Y}\dot{W} \text{ to } YW.\dot{Y}\dot{W},$$

is obtained as the first approximation. Therefore, shift the digit so that the exponent part of an original value expressed by the floating-point notations is even and the fixed-point part is in the above range (this shifting is called normalization of square root calculation), to calculate the square root of the fixed-point part, and then multiply the exponent part by ½, to obtain the square root of the original value.

Figure 19:
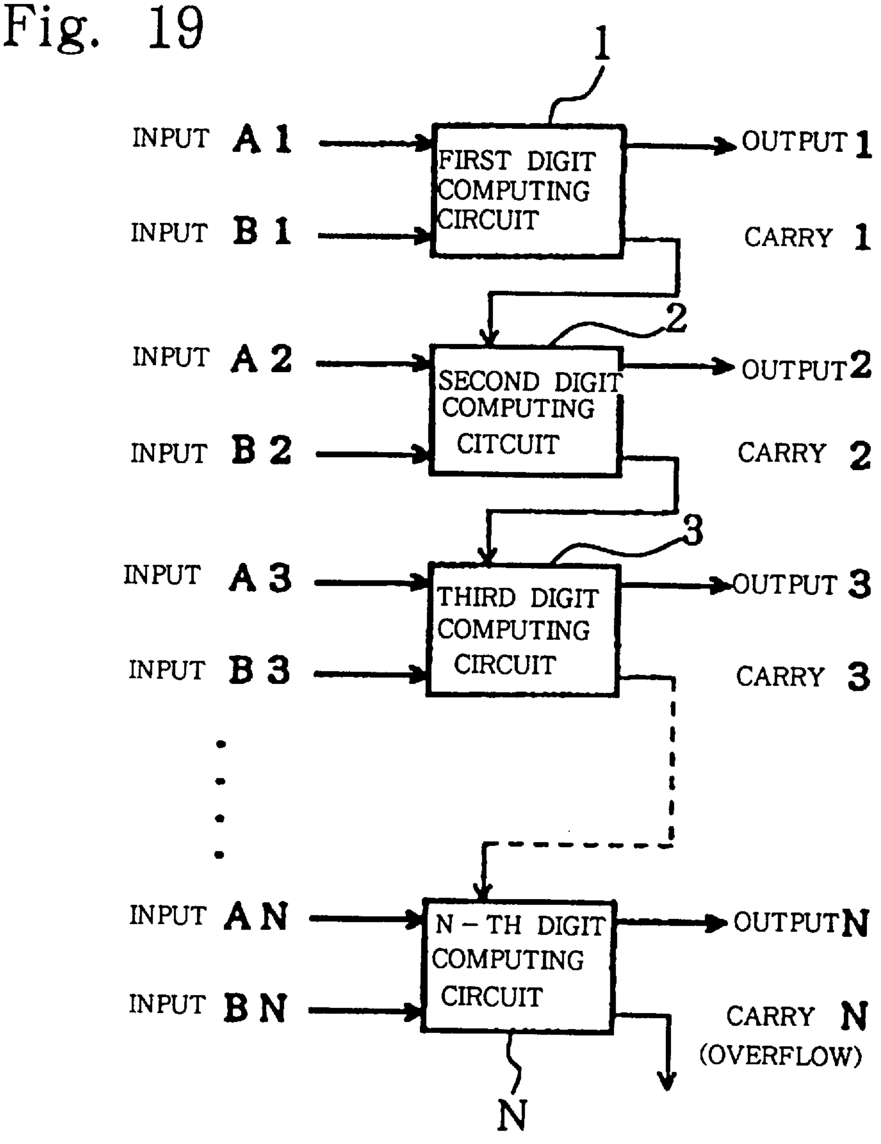
FIG. 19 is an arithmetic circuit in use for the ternary number system according to the first embodiment.
Figure 20:
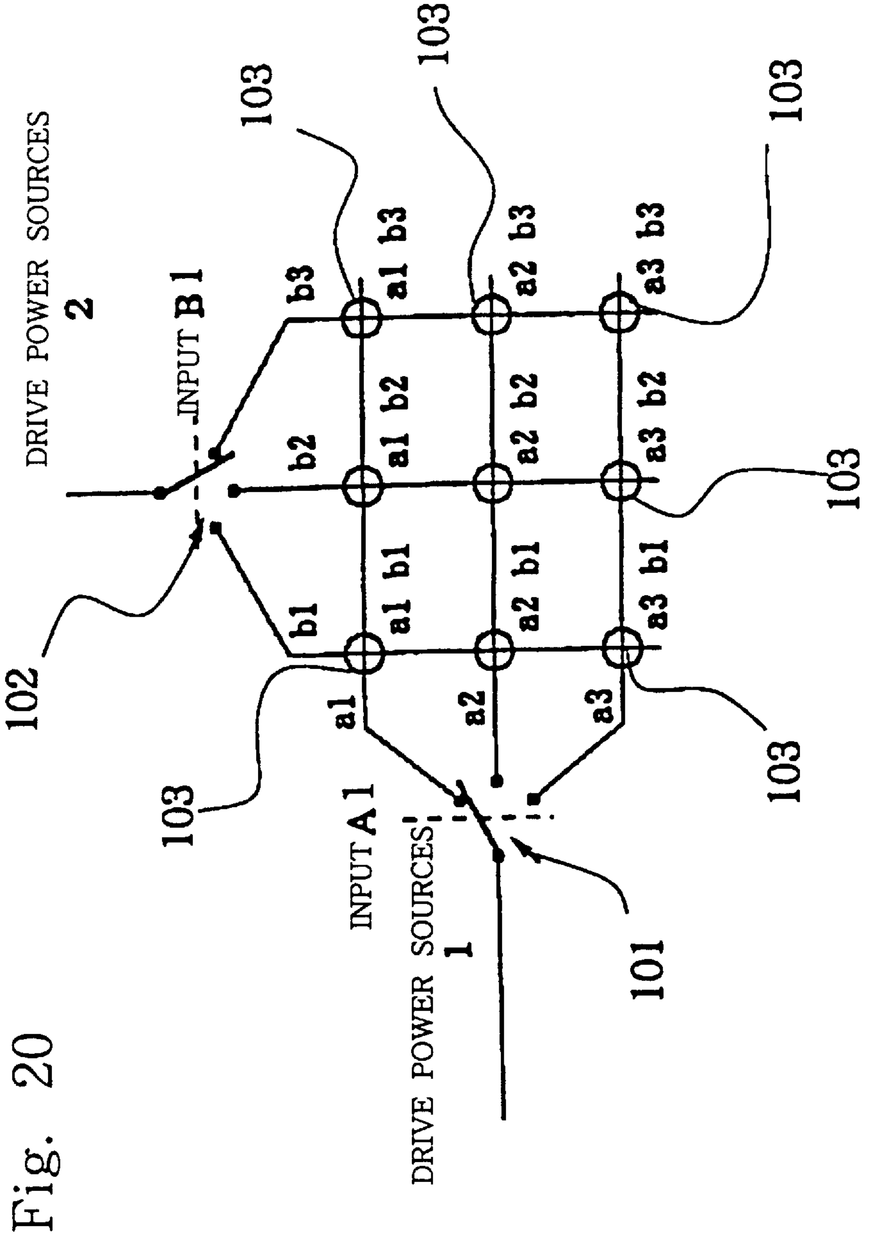
FIG. 20 is the detail of the first digit computing circuit in use for the ternary number system according to the first embodiment.
Figure 21:
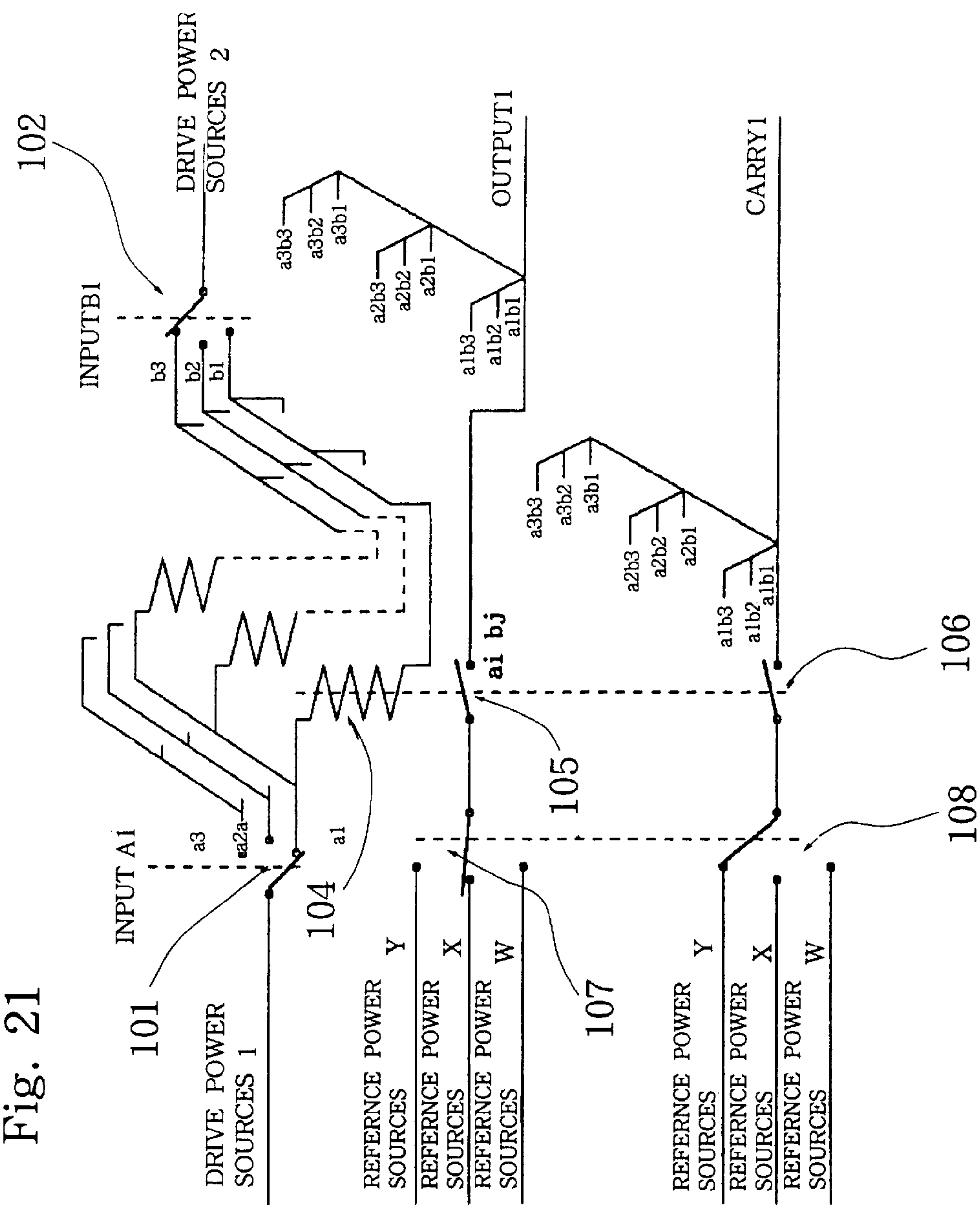
FIG. 21 is a separate arithmetic circuit in use for the ternary number system according to the first embodiment.
Figure 22:
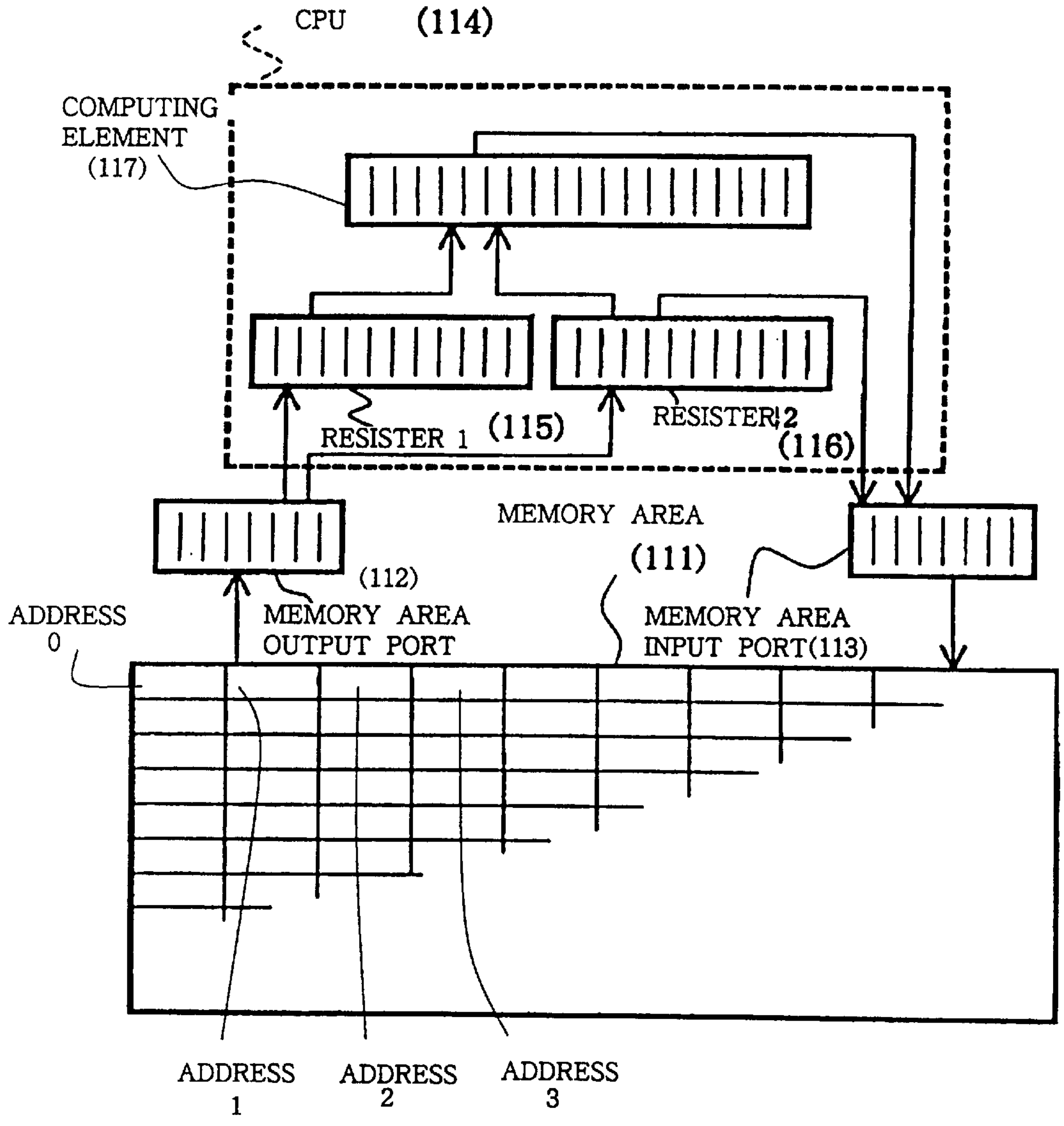
FIG. 22 is a diagram showing a schematic configuration of an electronic computer according to the second embodiment.
Figure 23:
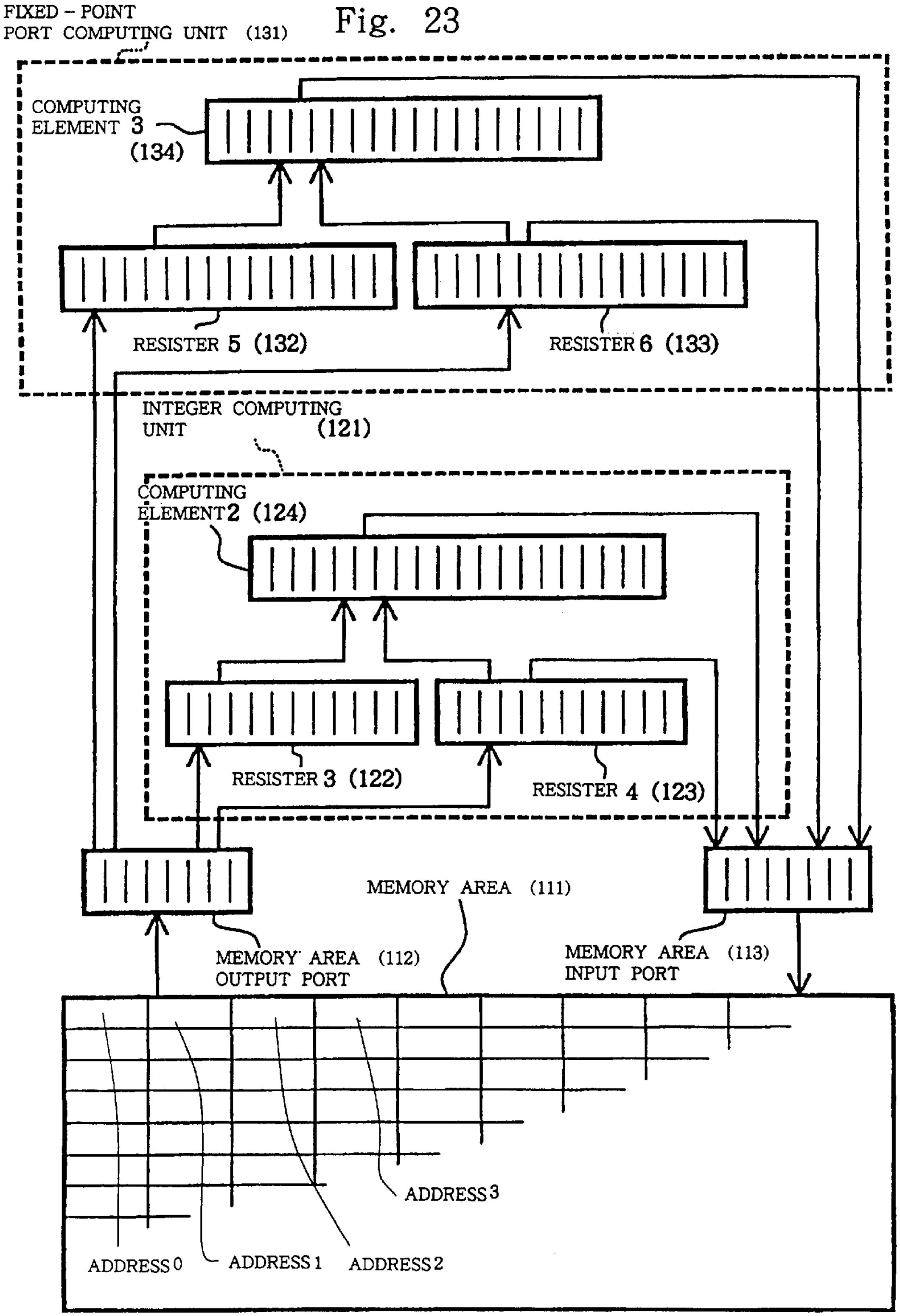
FIG. 23 is a diagram showing a schematic configuration of an electronic computer according to the third embodiment.

Now, detail description will be made for preferable embodiments of a CPU and computer according to the present invention referring to the attached drawings:

FIGS. 19 to 21 are computing circuit diagrams showing a CPU for the ternary system according to the first embodiment. FIG. 22 is a schematic diagram showing the configuration of an electronic computer according to the second embodiment. FIG. 23 is a schematic diagram showing the configuration of an electronic computer according to the third embodiment.

The CPU of the first embodiment shown in FIG. 19 consists of a first digit computing circuit (1), a second digit computing circuit (2), . . . , and an n-th digit computing circuit (N). Receiving signals of input A and B, the first digit computing circuit (1) makes computing, and the result is outputted as output 1. FIG. 20 shows the configuration of the first digit computing circuit (1) which is used for computing the lowest-order digits, so that no carry takes place therein. The circuit (1) has two switches: A changeover or selector switch 1 (101) which, receiving signal A1 expressing the first digit (the lowest digit) of input A, selects a connection with a drive power source 1; and a selector switch 2 (102) which, receiving signal B1 expressing the first digit (the lowest digit) of input B, selects a connection with a drive power source 2. The selector switches 1 (101) and 2 (102) respectively are changed over by input signals A1 and B1 to select one of nine operational elements (103) aibj (i=1, 2, 3, j=1, 2, 3) provided at each node in the circuit, and the circuit (1) is activated by a differential voltage of the power sources 1 and 2.

In this embodiment, the power source 1 has 5 V of voltage while the power source 2 has 0 V, but these voltages may be changed provided that they can drive a drive element (104) later described.

FIG. 21 shows the circuit (1) consisting of the nine operational elements (103), omitting over-lapping portions. With the selector switch 1 (101), in correspondence to notations of the ternary system, or notation Y expressing positive integer 1, notation W expressing negative integer −1 and notation x expressing zero, when one of a voltage signal same as a reference power source Y representing positive integer 1, a voltage signal same as a reference power source W representing negative integer −1 and a voltage signal same as a reference power source x representing zero is given to the circuit (1) as input signal A1, the given signal voltage closes one of contacts a1, a2 and a3 with other two contacts remained open. Similarly, with the selector switch 2 (102), in correspondence to notations of the ternary system, when one of a voltage signal same as a reference power source Y representing positive integer 1, a voltage signal same as a reference power source W representing negative integer −1 and a voltage signal same as a reference power source x representing zero is given to the circuit (1) as input signal B1, the given signal voltage closes one of contacts b1, b2 and b3 with other two contacts remained open. And, when the selector switches 1 (101) and 2 (102) are closed in the condition shown in FIGS. 20 and 21, the drive power sources 1 and 2 are connected only to an operational element (103) a1b3 via a circuit a1 selected by the selector switch 1 (101) and a circuit b3 selected by the selector switch 2 (102). In this embodiment, reference power sources Y, x and W respectively are of 5V, 0V and −5V, but other combinations may be adopted.

Now, description will be made for the operation of the operational element (103) referring to FIG. 21: At the nine nodes where contacts a1, a2 and a3 of the selector switch 1 (101) and contacts b1, b2 and b3 of the selector switch 2 (102) are combined, nine drive elements (104) respectively are provided. One drive element (104) (e.g., a1b3 in the drawings), which is selected from nine combinations of the conditions of the selector switches 1 (101) and 2 (102), is activated by the differential voltage of the drive power sources 1 and 2, to close one switch a1b3 among nine switches 1 (105) for output 1 and one switch a1b3 among nine switches 2 (106) for carry, with other 16 switches remained open. On the other hand, the nine switches 1 (105) for output 1 and the nine switches 2 (106) for carry respectively are connected to the refer-ence power sources Y, x and W via nine selector switches 3 (107) and nine selector switches 4 (108). The nine selector switches 3 (107) and nine selector switches 4 (108) can be transferred to such conditions as shown in FIGS. 5 and 6 based on a calculation mode by a drive system (not shown).

More particularly, in correspondence to an operation nature, e. g., addition, subtraction, inversion of positive/negative sign or shift of digit to the left or right, and in order to deal with all combinations of carry signals Y, x, W and others, a computing circuit may be prepared in which the selector switches 3 (107) and selector switches 4 (108) have been previously installed, to select a particular operational element (103) by a one-digit combination of the input signals A and B from nine operational elements (103) selected by a signal indicating the computing item and carry nature for obtaining output signal and carry signal, thereby realizing high-speed calculation. Further, in such a case as cost saving is intended at the cost of operation speed, the selector switches 3 (107) and selector switches 4 (108) may be transferred to the condition as shown in FIG. 5 by the input signal indicating the computing item or carry nature. If much more cost saving is normally intended by further reducing operation speed, a circuit may be prepared so as to have only one single selector switch 3 (107) and one single selector switch 4 (108) which can be transferred to the given conditions (25), (26) and (27) by a combination of input signal A (21), input signal B (22) and carry signal (23). Further, another circuit may be prepared so as to have only one selector switch which fetches out an output signal equivalent to that of the selector switch 3 (107) and then changes its setting to fetch out a carry signal equivalent to that of the selector switch 4 (108).

With the circuit shown in FIG. 21, when the selector switch 3 (107) and the selector switch 4 (108) are set as shown in the drawing, the output 1 takes the same voltage signal as the reference power source W while carry 1 takes the same voltage as the reference power source Y when input signals A1 and B1 respectively are a1 and b1.

As shown in FIG. 19, the carry 1 obtained in the first digit computing circuit (1) is inputted to a second digit computing circuit (2) along with inputs A2 and B2, to obtain an output 2 and carry 2. In such a way, successively an output N and carry N are obtained in an N-th digit computing circuit (N), but since the number of digits to be handled by the N-th digit computing circuit (N) is N, when the carry N is not the same voltage as the reference voltage x but the same voltage as the reference voltage Y or W, this circuit (N) judges that the calculation reached the uncomputable number of digits, so that the N-th digit computing circuit (N) outputs overflow error signal instead of carry N. In this connection, with the configu-ration shown in FIG. 19, N pieces of one-digit computing circuits (1), (2), . . . , (N) respectively make computing using a digit of input A, a digit of input B and a carry obtained from the preceding computing circuit of one digit lower order, to obtain the digit output and a carry to be sent to the next computing circuit. However, rather than making such a concurrent parallel processing, successive one-digit processings may be made at each circuit at separate timings one digit by one digit from the first digit.

FIGS. 19 to 21 show circuit diagrams including selector switches and open/close switches for easy understanding of the operation principle, but these devices may be replaced by transistors and switching elements. Further, the entire CPU may be integrated into one IC or included into an LSI.

Here, the CPU for ternary system is shown as the first embodiment, and in the same way a CPU for quinary system may be made. In this case, reference voltages may be taken as for example 0V, 2.5V, 5V, 7.5V and 10V corresponding to the integers −2 to 2, and all selector switches which are transferred by voltage signals equal to these voltages respectively have 5 contacts, so that 25 pieces of computing elements (103) in total must be provided at respective nodes shown in FIG. 20. In such a manner, this first embodiment can be adaptable as CPU for the general (2n+1) scale system.

FIG. 22 is a schematic diagram showing a configuration in use for electronic computers according to the second embodiment: A memory area (111) is divided into sub-areas of number of digits necessary for storing numbers suitable for handling its processors, and each sub-area is provided with a separate address such as 0, 1, 2, . . . To store one number, one or more sub-areas are used. According to the conventional computers, for example 8 digits in the binary system or 8 bits of data are used as one byte, using 1 to 16 bytes for one number.

Like the CPU according to the first embodiment, the memory area (111) uses three-different level voltages of e.g., 0V, 5V and 10V as signals expressing the integers −1 to 1 in the ternary system to store 6 digits in one address. This second embodiment uses voltage levels for data storage, but is not limited to the system, and may use three-levels conditions such as nonmagnetized, N to S magnetized and S to N magnetized conditions, or three-levels deflection angles. According to the second embodiment, the numbers which can be expressed by 6 digits in the ternary system are −364 to 364 in the decimal system, while 12 digits can express −265720 to 265720, the latter being equivalent to the data amount of about 19 bits according to the binary system.

In order to read data from this memory area, once copy the relevant 12-digit data of the ternary system in a memory area output port (112) which can store the data for the moment, from a relevant address in the memory area (111) in which specified data are stored, and then copy the data in an operational place. On the contrary, in order to put the data back to the memory area (111), once copy the used 12-digit data of the ternary system in a memory area input port (113) which can store the data for the moment, and then copy the data in the relevant address of the memory area (111) in which the data are stored.

FIG. 22 shows the route through which data are transferred between the memory area (111) and CPU (114). Data are similarly transferred between I/O devices (not shown) and the memory area (111) too. The CPU consists of two registers 1 (115) and 2 (116) and one computing element (117) serving as abacus.

Now, description will be made for how data are transferred successively as follows:

An address where specified data are stored in the memory area (111) and data stored in the next address are copied in the memory area output port (112), but the specified data in the memory area (111) are never lost. Then, the data stored in the memory area output port (112) are copied in one register 1 (115) or other 2 (116), when the data in the memory area output port (112) will be never lost. When the specified data in the memory area (111) is 6 or 12 digits of ternary codes, this data transfer terminates, but for larger digits, they are copied in one register 1 (115) or other 2 (116) via the memory area output port (112) in the same way as described above, from the next address to the address where the specified data are stored. In such a way, data having digits enough to express the number are copied in one register 1 (115) or other 2 (116).

On the contrary to the above, when going to store data back in a specified address in the memory area (111), 12 digits of data in the ternary code are once copied in the memory area input port (113) via the computing element (117) or the register 2 (116). When the data are 6 digits in the ternary code, they are copied in the specified address in the memory area (111), while the data are 12 digits in the ternary code, they are copied in the specified address and the next address. If the data are larger than 12 digits in the ternary code, the above operation is repeated while changing the address successively, thus copying all digits of data in the memory area (111). In this connection, normally, when an operation requires two numbers, the one uses a number in the CPU (114) and the other is copied in one register 1 (115) or other 2 (116) from the memory area (111) for use.

Further, operation results are stored in the register 2 (116) or the computing element (117) in the CPU (114). Only when a command to store the data in the memory area (111) is outputted, they are stored in a specified address and the next address in the memory area (111) via the memory area input port (113).

Now, description will be made for how to make the four arithmetics operation in the computer according to the second embodiment referring to FIG. 22:

Addition: (Augend)+(addend)=sum

A number in the computing element (117) is used as augend. An addend is copied in the register 1 (115) via the memory area output port (112) from the memory area (111). The number in the computing element (117) is added by the number in the register 1 (115). The result or sum is retained in the computing element (117).

Subtraction: (Minuend)−(subtracter)=difference

Subtraction is made by making similar addition to the above, but a positive/negative sign of the number in the register 1 (115) is inverted before making the addition. The result or difference is retained in the computing element (117).

Multiplication: Multiplicand)×(multiplier)=product

A number in the register (115) is used as multiplicand. The multiplier is copied in the register 2 (116) via the memory area output port (112) from the memory area (111). All digits of notations in the computing element (117) are reset to zero notation or cleared. One digit by one digit of the number stored in the register 2 (116) is taken out, multiply the one-digit signal and a value obtained by the digit position by the number in the register (115) and add the result to the number in the computing element (117). When all addition operations are finished for the all digits of the number stored in the register 2 (116), the multiplication operation will come to the end, and the product obtained is retained in the computing element (117).

Division: (Dividend)/(divisor)=quotient

A number in the computing element (117) is used as dividend. Add the number twice to double it. The divisor is copied in the register 1 (115) via the memory area output port (112) from the memory area (111). Hereafter, the quotient is obtained one digit by one digit in the same way as the above described longhand division calculation, and the quotient obtained is retained in the register 2 (116).

For easier explanation of how data are transferred in a configuration according to the second embodiment, the configuration shown in FIG. 22 consists of the registers 1 (115), registers 2 (116) and the computing element (117) which have respectively different functions, but the second embodiment is not limited to the configuration in FIG. 22. In other words, the second embodiment may be a configuration which has two or more registers and computing elements that respectively have all or a part of the following functions: (1) to store one or more digits in the ternary code notations, and to implement addition one digit by digit; (2) to implement carry processing; (3) to invert positive/negative sign; (4) to make logical operation digit by digit; (5) to obtain the sum of two or more-digit signals, regarding them as signals expressing individual numbers for every digit; (6) to transfer one or more digits to the upper- or lower-order direction; (7) to transfer digits to the upper- or lower-order direction, and restore once lost signals from the end of the opposite side as if digit or digits are rotated; (8) to transfer digits until signals other than zero signal come to the uppermost or lowermost digit; and (9) to count the number of digits which were then transferred, and which can use properly these elements selectively for the operational purposes, or which has been united into one computing element by connecting them properly when larger digits of calculation is required.

With the computer according to the second embodiment, since the memory area allocates one address for every 6 digits in the ternary code, the data may be taken out as the notations in the ternary code, but this method requires simply so many number of digits, thus making it difficult to distinguish one number from another. Therefore, preferably, the data are noted in the ennead code system by dividing two digits by two digits, or in the 27 coded system by dividing three digits by three digits.

With the computer according to the second embodiment, when it is used as an independent unit to input data, make conversion of the decimal number and other daily-use numbers into the ternary numbers, and perform operation and the like, while making conversion of the ternary number into the decimal number, outputting for data printing, screen display and the like, control of NC machines, communication and the others, all processing may be performed only in the ternary system, but can be combined with the conventional computer to proceed only a part in the ternary system.

FIG. 23 is a diagram showing a schematic configuration of an electronic computer according to the third embodiment:

A memory area (111) of the computer is divided into sections 6 digits large in the ternary code system, respectively attached with numbers. The number is called address, and the magnitude of one section or 6 digits in the ternary system is called a word here. The memory area (111) stores not only numeric data of a particular form into which daily use data in use for operation and information processing are transformed, but also programs consisting of command groups that the computer must perform and change commands which change the operational sequence of the command group.

Like the second embodiment, the computer according to the third embodiment copies for the time being a piece of data fetched out of the memory area (111) in the memory area output port (112) of three words capacity, and then further copies the data in an intended place. The CPU in the third embodiment consists of an integer computing unit (121) handling integer numbers, character string data and exponent parts of the floating-point type numeric data; and a fixed-point part computing unit (131) handling fixed-point parts of the floating-point type numeric data. Like in the computer according to the second embodiment, the integer computing unit (121) includes registers 3 (122) and 4 (123) as well as a computing element 2 (124), while the fixed-point part computing unit (131) includes registers 5 (132) and 6 (133) as well as a computing element 3 (134). In order to store data from the computing units to the memory area (111), data stored in the computing units are once copied in a memory area input port (113) of 3 words capacity, and then again copied in a proper place in the memory area (111) assigned to store the data.

With the computer according to the third embodiment, there are two address system, direct and indirect, to rewrite and read the contents stored in the memory area (111). When rewriting the contents off the above described command group and the change command for changing the implemen-tation sequence of the command group, the direct address system is used to directly specify the address of the memory area (111), and rewrite its one word and words in successive areas as required. On the contrary, with the above mentioned numeric data, an address is specified by the indirect address system looking up a data area management table (not shown), and only one word in the specified address and words (as required) in the successive areas are rewritten for storage. The data area management table has a space enough to accommodate all variables to be used in programs under implemen-tation, and respective blocks corresponding to respective variables store the address in the memory area (111) for storing the numeric data of the variable and the number of words to be used for the numeric data.

Before implementing programs, only a blank space enough to accommodate all variables in use for the programs is prepared for the data area management table. When the implementation starts and the computer is going to store numeric data, the computer searches for what blocks in the memory area (111) are blank and what block is the best among them from the standpoint of the number of words required by the numeric data, writes the address and number of words in the data area management table, and further writes numerical data in an area (starting from the address) covering the number of words required. In this connection, when storing the numeric data, even if an address in the data area management table assigned for the variable has already been filled with too many number of words for storing this time numeric data, a new place is never assigned in the memory area (111), but the same place as the preceding one is used. When the number of words already occupied is smaller than required this time, the previous place is discarded, and a new place is secured, thus resulting in rewriting of the data area management table. For numeric data whose required number of words is known, an area enough to accommodate the number of words should be secured previously in the initialization step, thus eliminating the need for modifying the area later. As a result, even for variables to store numeric data whose magnitude is unknown, this method can not only eliminate the need for preparing too large a space, but use a space only enough to cover the numeric data, resulting in an effective use of the memory area (111).

There are two types of numeric data, that is, integer type and floating-point type, to be handled by the computers according to the third embodiment. Both types of numeric data are of variable length which is to be stored in an area large enough for the number of words the numeric data requires. The floating-point type numeric data consists of a fixed-point part of fixed-point type data structure (150) and an exponent part of a data structure same as the integer type data structure (140) for storing integers and character string data.

Figure 24:
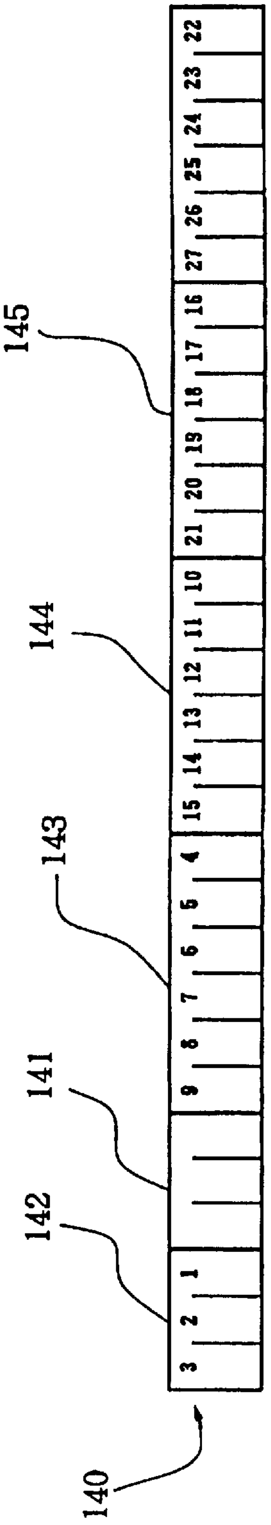
FIG. 24 is an illustration showing an integer data structure.

FIG. 24 shows the integer type data structure (140) in which the number (3) of significant digits (141) in the ternary system and the lower-order 3 digits (142) of an integer are stored in a specified address. The number of significant digits (141) should be positive integer, not nega-tive nor zero. As a result, the decimal number to be expressed using this type of 3-digit ternary number ranges 1 to 27, so that a value (−13 to 13) which is obtained by subtracting a decimal number 14 is written in the space (141). When the above written number is larger than −10, that is, when the number of actual digits is larger than 4, the data cannot be stored by one single word, so that successive areas (143, 144, 145, . . . ) are used as required. In other words, 4-th to 9-th digit of an integer is written in the next address, 10-th to 15-th digit of an integer is written in the subsequent address, and so on. The numbers (1 to 27) written in the areas (142, 143, 144, 145, . . . ) in FIG. 24 indicate the number of the digit. In such a manner, the number of words allowed for use in the integer type data structure (140) ranges one word to 5 words at maximum; One word (141, 142) can store variable values ranging −13 to 13 in the decimal number, two words (141, 142, 143) can store variable values ranging −9841 to 9841, and three words (141, 142, 143, 144) can store variable values ranging −7174453 to 7174453. In this connection, when the integer type numeric data value is zero, the number of significant digits (141) is WWW indicating one digit or −13 in the decimal number, and the lower-order three digits (142) of an integer is xxx.

The floating-point type numeric data consists of a normalized fixed-point part of floating-point notations and an exponent part. When they are stored in the memory area (111), one number is expressed by the integer type data structure (140) storing the exponent part and the fixed-point type data structure (150) storing the fixed-point part. The integer type data structure (140) in here is the same as that in FIG. 24, and this address is written in the data area management table. However, the number of words to be written in the data area management table is not limited to the number of words to be used in this integer type data structure (140), but includes the sum too added with the number of words to be used in the fixed-point type data structure (150) which will be described in detail.

Figure 25:
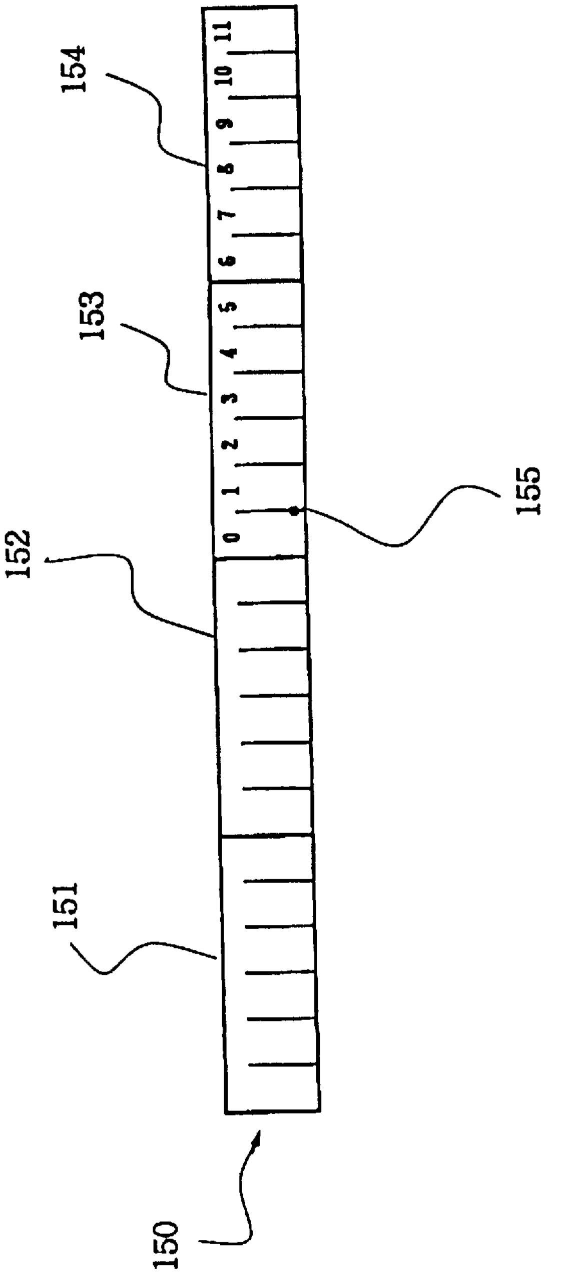
FIG. 25 is an illustration showing a fixed-point part data structure.

FIG. 25 shows the fixed-point type data structure (150): In an address following the area used for the integer type data structure for storing the exponent part, the number of the starting digit (151) indicating the starting point of recurring decimal is written, and in the next address, the number of the terminating digit (152) indicating the terminating point of recurring decimal is written. For the numbers of the starting and terminating digits, values j of decimal j-th digit of the fixed-point part are written, but for the integer first digit of the fixed-point part, zero is written as the value of j. In the fixed-point data areas (153, 154) in FIG. 25, the numbers at the number of the digit (0 to 11) are written, and attached with the position of decimal point (155). The numbers of the starting and terminating digits (151) and (152) both should be 0 or positive integer to be expressed by 6 digits in the ternary system, so that it may be expressed by −364 to 364 in the decimal number system, but 364 is added to them to convert the range to such a positive range as 0 to 728. On the contrary, if 121 words at maximum are allowed for storing the fixed-point part, the number of the digits can range 0 to 725 in the decimal number system. As described previously, when the number of digit of the recurring section is one, or having the same number of the starting and terminating digits, a same value is written both in the starting digit number (151) and the terminating digit number (152). The fixed-point part of the fixed-point type data structure (150) need not write lower digits than the terminating digit of the recurring decimal, thus making the number of words required for storing equal to that calculated from the terminating digit number (152).

In other words, when the terminating digit number (152) is −359 in the decimal system, the digit number becomes 5 by being added with 364, or one word, so that the entire fixed-point type data structure (150) requires three words consisting of one word of starting digit number (151), one word of terminating digit number (152) and one word of fixed-point data (153).

When a value of numeric data to be stored in the fixed-point type data structure is not a recurring decimal, but an integer value or a decimal value like 1/3 which is normalized by shifting the digit of a number divisible by the ternary notation, a digit number indicating the last end of the significant number of the fixed-point part is written as the digit number (152) of the terminating point. At this time, the digit number (151) of the starting point is made a value larger than the digit number (152) of the terminating point to indicate it is not a recurring number. Here, the maximum value whose number of digits can be stored or a value equivalent to 728 in the decimal number is written as its represen-tative value. In this connection, to store a value which cannot be expressed as recurring decimal in the above region like π or circular number, or the square root of 2, or a number which is theoretically not a recurring decimal, write the value of the fixed-point part of significant number digits which is required by the program, and then in such a way as the above mentioned divisible number write the digit number at the last end of the fixed-point part as the digit number (152) of the terminating point, and write a value equivalent to 728 in the decimal number as the digit number (151) of the starting point.

In order to read out numeric data stored according to the above procedure from the memory area (111), refer to the data area management table using a variable name with which numeric data is stored, to obtain the address and the number of words of numeric data. This address indicates the significant digit number (141) of the integer type data structure and the address of the lower-order three digits (142) of the integer value. Copy this address and the content of successive two words (143, 144) from the memory area (111) to the memory area output port (112), add ternary YWWW equivalent to decimal 14 to the significant digit number (141), and again copy this value in a counter (not shown). Then, depending on an application end of the integer type numeric data, copy the value in a register 3 (122) or register 4 (123) close together to the right so as to position data of its number of digits in place. When the digit number copied in the counter is over 16, further copy next three words from the memory area (111) to the memory area output port (112), and attach thereafter a data of necessary word number in the register 3 (122) or register 4 (123). In such a manner copy an integer value of 27 digits maximum from the memory area (111) to the register 3 (122) or register 4 (123).

In this connection, positive/negative sign or zero of its integer type numeric data can be determined by a digit signal indicated by the counter.

When a numeric data read out of the memory area (111) is of floating-point type, a program, which has naturally known that from the variable name, copies, as part of read command operation, three words from the next address of integer type data structure (140), that is, the starting point digit number (151) and the terminating point digit number (152) of the fixed-point type data structure (150) and a fixed-point data (153) of 0 to 5 digits of the fixed-point part, from the memory area (111) to the memory area output port (112), and then copies them in starting-point and terminating point counters (not shown), and finally copies the data of 0 to 5 digits of the fixed-point part in registers 5 (132) or 6 (133) close together to the left, depending on its application. Next, when the digit number calculated from the value of the terminating counter is over 6, the data of word number of fixed-point part is copied from the memory area (111) via the memory area output port (112) in the register 5 (132) or register 6 (133) close together to the left so as to position the data in place. In this case, positive/negative sign or zero of its fixed-point part can be determined by a 0-digit signal.

When digit number of fixed-point part is larger than digit number which can be handled by the fixed-point number computing unit (131), the part may be divided into several sub-parts for computation.

Figure 26:
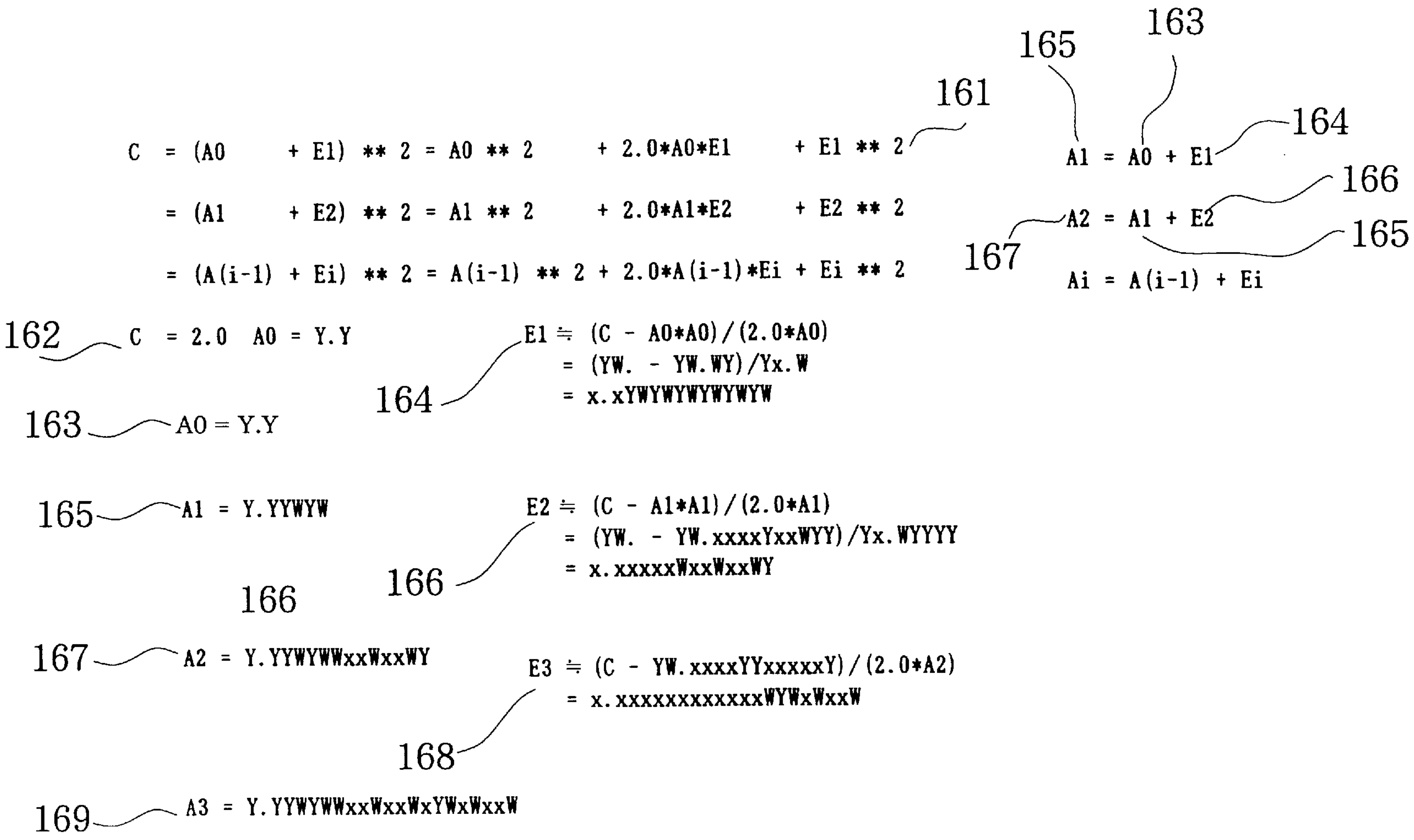
FIG. 26 is illustrations showing how to obtain approximate values using the successive approxi-mation method.

Now, an example is described as follows, in which the calculation of the square root of 2 made by ternary longhand (as shown in FIG. 15) is made by the computer: As shown in FIG. 26, a successive approximation technique is used. More particularly, as shown in formula (161), an approximate value A of a square root and the then error E are used for determining the next approximate value, thus step by step minimizing the error. As shown in FIG. 26, a value C (162) whose square root is being obtained is 2. 0 here, and the first approximation A0 (163) is assumed to be 4/3 or ternary Y. Y. The error E1 (164) at this time is a following recurring number by omitting the square term in E1 in the formula (161):

$$x.x\dot{Y}\dot{W}$$

When an approximation A1 (165) has come to Y. YYWYW or down to the fifth digit decimal, like the above, the approximation error E2 (166) is x. xxxxxWxxWxxWY or of a value whose significant number ranges from the decimal 6-th digit to the 13-th digit, thus showing that there is no error in the digits higher than the decimal 5-th digit. When similar operation is performed for the next approximation A2 (167) expressed down to the decimal 13-th digit, the approximation error E3 (168) was of a value whose significant number ranges from the decimal 13-th digit to the 20-th digit. This shows that the decimal 13-th digit of the approximation A2 (167) was not correct, thus suggesting a correction of the decimal 13-th digit by addition of error approximation to obtain the approximation A3 (169). As described above, FIG. 4 shows that, according to the (2n+1) scale method, a notation in each digit or a value expressed by a signal is in the median of a range which lower-order digits may express, thus having small error, and the potential equal chance of using positive/ negative signs may cancel the signs with each other in their calculation, thus resulting in a minimized carry. As shown in FIGS. 16 to 18 too, this difference is two digits at worst, so that, if the constraint by the digit number usable in the fixed-point number computing unit (131) prevents an operation at one setting, several divisional operations may be performed. Operation of square root of 2 shown in FIG. 26 also is not performed only within the fixed-point number computing unit (131), but tentative storage and reading of numeric data is to be made between the memory area (111).

When storing final numeric data of integer type such as integer values or character string data from the computing element into the memory area (111), the word number required for the memory area (111) is calculated using the counter value. When the data is of floating-point number type, modify the digit position so as to have a normalized fixed-point part, and the word number required for the memory area (111) is calculated using the counter value in the exponent part and the terminating counter value of the fixed-point part. Stored address is obtained by looking up the data area management table in reference to the word number. Then, convert the content of the integer computing unit (121) into the integer type data structure (140), copy three digits by three digits in the memory area input port (113), copy the significant digit (141) and the lower-order three digits of the integer number step by step into the address of the memory area (111) and finally store these data. When the numeric data is of floating-point type, further convert the content of the fixed-point number computing unit (131) into the fixed-point type data structure (150), copy the data in the memory area input port (113), copy three words by three words into the memory area (111) starting from the starting point digit number (151), and finally store them.

As described above, the CPU uses one signal selected from (2n+1) pieces of signals that represent a set of digits $\{X_1, X_2 \ldots X_{2n+1}\}$ consisting of n pieces of signals expressing n pieces of positive integers 1 to n, n pieces of signals expressing n pieces of negative integers −1 to −n and one signal expressing zero, to express one digit of number, and makes computing operation using the (2n+1) scale of one or more digits (where n is one or larger positive integer), so that CPU using such a break-through operation technique can be provided.

Further, this method can make full use of the above described features of the notations and operational technique according to the (2n+1) scale system, thereby not only enhancing opera-tional accuracy but also increasing calculation speed.

As described above, the CPU uses one signal selected from (2n+1) pieces of signals consisting of n pieces of signals expressing n pieces of positive integers 1 to n, n pieces of signals expressing n pieces of negative integers −1 to −n and one signal expressing zero to express one digit of number, and has the memory area to store one or larger digits of the (2n+1) scale data (where n is one or larger positive integer), and the CPU which receives one or more digits of the (2n+1) scale data from the memory area and outputs one or more digits of the (2n+1) scale data so as to handle them. Therefore, when copying and transferring the data, this CPU can eliminate the need for changing data notation system between the memory area, or can store the data as they are, resulting in the enhancement of process speed and the maintenance of the inherent accuracy to the number system.

With the described computer the CPU comprises an integer computing element to handle an integer type data and a fixed-point number computing element to handle a fixed-point part of floating-point type numeric data. Since the exponent part of the floating-point type numeric data is processed by the integer computing element, the integer type data and the exponent part of the floating-point type numeric data to be processed by the integer computing element are placed close together to the right, and all upper-order digits than a digit expressing positive/negative sign are zero, thus eliminating the need for computing them. Further, since the fixed-point part of floating-point type numeric data to be processed by the fixed-point number computing element are placed close together to the left with the fixed decimal point position, so that the computer can perform processing which makes the most of the features of respective computing elements.

Since the integer type data are placed close together to the right and all upper-order digits than a digit expressing positive/negative sign are signals expressing zero, the digits can be omitted for storage. Further, since the fixed-point part of floating-point type numeric data are placed close together to the left with the fixed decimal point position, lower-order digits than the terminating point digit of the recurring section of a recurring decimal and lower-order digits than the lowest digit of significant number of a non-recurring decimal both can be omitted for storage, the memory area can be used effectively.

I claim:

1. A data processing system comprising:

a memory for storing a group of digits that represent a number to be processed, wherein each said digit is one from a set of $\{X_1, X_2 \ldots X_{2n+1}\}$ digits that have a radix of (2n+1) and are representative of the set of numbers $\{-n, \ldots -1, 0, 1 \ldots n\}$, respectively, wherein n is an integer and $n \geqq 1$ so that a group of at least two said digits representative of a non-zero number has a most significant digit representative of the magnitude and the positive/negative state of the number; and an arithmetic processing unit connected to said memory for receiving said $\{X_1, X_2 \ldots X_{2n+1}\}$ digits therefrom, said arithmetic processing unit being further configured to perform processing on one or more numbers formed by said $\{X_1, X_2 \ldots X_{2n+1}\}$ digits so as to produce an initial result having a first number of least significant $\{X_1, X_2 \ldots X_{2n+1}\}$ digits, wherein said arithmetic processing unit selectively truncates said initial result to provide a rounded result having a second number of least significant $\{X_1, X_2 \ldots X_{2n+1}\}$ digits, said second number of least significant $\{X_1, X_2 \ldots X_{2n+1}\}$ digits being less than said first number of least significant $\{X_1, X_2 \ldots X_{2n+1}\}$ digits, wherein during said truncation, a third number of least significant $\{X_1, X_2 \ldots X_{2n+1}\}$ digits of said initial result is dropped from said first number of least significant $\{X_1, X_2 \ldots X_{2n+1}\}$ digits to form said rounded result, wherein the absolute value of said third number of least significant $\{X_1, X_2 \ldots X_{2n+1}\}$ digits is less than one-half of the absolute value of a remaining smallest digit of said rounded result, said rounded result being stored in said memory.

2. The data processing system of claim 1, wherein:

said memory is configured so that said $\{X_1, X_2 \ldots X_{2n+1}\}$ digits forming a group of digits are stored as groups to represent integer-type data or floating point-type data, wherein groups of said $\{X_1, X_2 \ldots X_{2n+1}\}$ digits that represent integer-type data are stored in an integer-type group of said $\{X_1, X_2 \ldots X_{2n+1}\}$ digits and groups of said $\{X_1, X_2 \ldots X_{2n+1}\}$ digits that represent a floating point-type data are stored so as to have a mantissa stored in a fixed-point group of said $\{X_1, X_2 \ldots X_{2n+1}\}$ digits and an exponent stored as an integer-type group of said $\{X_1, X_2 \ldots X_{2n+1}\}$ digits, said memory being configured to store mantissas comprising a fixed number of said $\{X_1, X_2 \ldots X_{2n+1}\}$ digits;

said arithmetic processing unit has an integer computing element for performing processing on said integer-type groups of said $\{X_1, X_2 \ldots X_{2n+1}\}$ digits including said exponent of floating point-type data represented as said integer-type group of said $\{X_1, X_2 \ldots X_{2n+1}\}$ digits and a fixed-point computing element for performing processing on said fixed-point groups of said $\{X_1, X_2 \ldots X_{2n+1}\}$ digits; and if said fixed-point computing element produces said initial result comprising more $\{X_1, X_2 \ldots X_{2n+1}\}$ digits than can be stored as a mantissa, said third least significant digits of said initial result will be truncated by said arithmetic processing unit prior to storage in said memory.

3. The data processing system of claim 2, wherein said arithmetic processing unit is configured to perform addition, subtraction, multiplication and division of numbers comprising sets of said $\{X_1, X_2 \ldots X_{2n+1}\}$ digits.

4. A data processing method comprising the steps of:

(a) reading a group of digits from a memory that represent a number to be processed, wherein each said digit is one from a set of $\{X_1, X_2 \ldots X_{2n+1}\}$ digits that have a radix of (2n+1) and are representative of the set of numbers $\{-n, \ldots -1, 0, 1 \ldots n\}$, respectively, wherein n is an integer and $n \geqq 1$ so that a group of at least two said digits representative of a non-zero number has at least one most significant digit representative of the magnitude and the positive/negative state of the number;

(b) processing said $\{X_1, X_2 \ldots X_{2n+1}\}$ digits in an arithmetic processing unit connected to said memory, said arithmetic processing unit receiving said $\{X_1, X_2 \ldots X_{2n+1}\}$ digits from said memory, said arithmetic processing unit being further configured to perform processing on one or more numbers formed by said $\{X_1, X_2 \ldots X_{2n+1}\}$ digits so as to produce an initial result having a first number of least significant $\{X_1, X_2 \ldots X_{2n+1}\}$ digits;

(c) truncating said initial result using said arithmetic processing unit to provide a rounded result having a second number of least significant $\{X_1, X_2 \ldots X_{2n+1}\}$ digits, said second number of least significant $\{X_1, X_2 \ldots X_{2n+1}\}$ digits being less than said first number of least significant $\{X_1, X_2 \ldots X_{2n+1}\}$ digits, wherein, during said truncation, a third number of least significant $\{X_1, X_2 \ldots X_{2n+1}\}$ digits of said initial result is dropped from said first number of least significant $\{X_1, X_2 \ldots X_{2n+1}\}$ digits to form said rounded result, wherein the absolute value of said third number of least significant $\{X_1, X_2 \ldots X_{2n+1}\}$ digits is less than one-half of the absolute value of a remaining smallest digit of said rounded result; and (d) storing said rounded result in said memory.

* * * * *

UNITED STATES PATENT AND TRADEMARK OFFICE

CERTIFICATE OF CORRECTION

PATENT NO. : 5 822 233

DATED : October 13, 1998

INVENTOR(S) : Hiroyuki KAWASAKI

It is certified that error appears in the above-identified patent and that said Letters Patent is herebv corrected as shown below:

Column 28, line 17,

Please add the following claim:

5. The data processing method of Claim 4, wherein said arithmetic processing unit is configured to perform addition, subtraction, multiplication and division of numbers comprising sets of said $\{x_1, x_2 \cdots x_{2n+1}\}$ digits.

Signed and Sealed this

Twenty-ninth Day of June, 1999

Attest:

Q. TODD DICKINSON

Attesting Officer

*Acting Commissioner of Patents and Trademarks*